(12) United States Patent
Muller

(10) Patent No.: US 8,826,289 B2
(45) Date of Patent: *Sep. 2, 2014

(54) METHOD AND SYSTEM FOR MANAGING VIRTUAL AND REAL MACHINES

(75) Inventor: Leslie Muller, London (GB)

(73) Assignee: VMware, Inc., Palo Alto, CA (US)

( * ) Notice: Subject to any disclaimer, the term of this patent is extended or adjusted under 35 U.S.C. 154(b) by 61 days.

This patent is subject to a terminal disclaimer.

(21) Appl. No.: 13/430,096

(22) Filed: Mar. 26, 2012

(65) Prior Publication Data

US 2012/0240114 A1 Sep. 20, 2012

Related U.S. Application Data

(63) Continuation of application No. 11/903,374, filed on Sep. 21, 2007, now Pat. No. 8,171,485.

(60) Provisional application No. 60/919,965, filed on Mar. 26, 2007.

(51) Int. Cl.
G06F 9/455 (2006.01)
G06F 9/46 (2006.01)
G06F 15/173 (2006.01)

(52) U.S. Cl.
USPC ............... 718/104; 718/1; 718/100; 718/105; 709/223; 709/224; 709/226

(58) Field of Classification Search
None
See application file for complete search history.

(56) References Cited

U.S. PATENT DOCUMENTS

| | | | |
|---|---|---|---|
| 6,408,282 B1 | 6/2002 | Buist | |
| 6,490,445 B1* | 12/2002 | Holmes | 455/419 |
| 6,802,062 B1 | 10/2004 | Oyamada et al. | |
| 7,035,819 B1 | 4/2006 | Gianakorous et al. | |
| 7,113,924 B2 | 9/2006 | Fishbain | |
| 7,127,506 B1* | 10/2006 | Schmidt et al. | 709/224 |
| 7,356,679 B1* | 4/2008 | Le et al. | 713/1 |
| 7,487,125 B2 | 2/2009 | Littlewood | |
| 7,539,640 B2 | 5/2009 | Burns et al. | |
| 7,567,929 B2 | 7/2009 | Kemp et al. | |
| 7,577,600 B1 | 8/2009 | Zagara et al. | |
| 7,577,722 B1* | 8/2009 | Khandekar et al. | 709/220 |
| 7,580,946 B2 | 8/2009 | Masour et al. | |
| 7,734,533 B2 | 6/2010 | Mackey et al. | |
| 8,230,059 B1* | 7/2012 | Santos et al. | 709/224 |
| 8,234,640 B1* | 7/2012 | Fitzgerald et al. | 718/1 |
| 2002/0069335 A1* | 6/2002 | Flylnn, Jr. | 711/153 |
| 2002/0069369 A1* | 6/2002 | Tremain | 713/201 |
| 2002/0120660 A1* | 8/2002 | Hay et al. | 709/100 |
| 2002/0194482 A1* | 12/2002 | Griffin et al. | 713/176 |
| 2002/0198815 A1 | 12/2002 | Greifeld et al. | |

(Continued)

OTHER PUBLICATIONS

Domingue et al. "Integrated Project Proposal" IST Call 1, FP7, BOSS: Boss Operation Services based on Semantics, Nov. 27, 2006, pp. 1-31.

(Continued)

Primary Examiner — Charles Swift

(57) ABSTRACT

Managing virtual and real machines through a provisioning system. The provisioning system allows a user to create and manage machines through a "self-service" approach. The provisioning system interacts with one or more agents that manage the lifecycle of a machine. The system may provide templates that enable a user to readily create a virtual machine. The system may also include interfaces for administrators to manage virtual and real machine resources.

30 Claims, 24 Drawing Sheets

(56) References Cited

U.S. PATENT DOCUMENTS

| | | |
|---|---|---|
| 2003/0050879 A1 | 3/2003 | Rosen et al. |
| 2003/0084018 A1 | 5/2003 | Chintalpati et al. |
| 2003/0084372 A1 | 5/2003 | Mock et al. |
| 2003/0101245 A1 | 5/2003 | Srinivasan et al. |
| 2003/0154112 A1 | 8/2003 | Nelman et al. |
| 2003/0233386 A1 | 12/2003 | Waki et al. |
| 2004/0010592 A1 | 1/2004 | Carver et al. |
| 2004/0111506 A1 | 6/2004 | Kundu et al. |
| 2004/0205187 A1 | 10/2004 | Sayal et al. |
| 2005/0044228 A1 | 2/2005 | Birkenstrand et al. |
| 2005/0050545 A1 | 3/2005 | Moakley |
| 2005/0235044 A1* | 10/2005 | Tazuma ................ 709/217 |
| 2005/0262232 A1 | 11/2005 | Cuervo et al. |
| 2006/0069995 A1 | 3/2006 | Thompson et al. |
| 2006/0123217 A1 | 6/2006 | Burdick et al. |
| 2006/0143204 A1 | 6/2006 | Fish |
| 2006/0190605 A1 | 8/2006 | Franz et al. |
| 2006/0235733 A1 | 10/2006 | Marks |
| 2006/0265656 A1* | 11/2006 | Lambert et al. ................ 715/705 |
| 2006/0294517 A1* | 12/2006 | Zimmer et al. .................... 718/1 |
| 2007/0043860 A1* | 2/2007 | Pabari .......................... 709/224 |
| 2007/0067435 A1* | 3/2007 | Landis et al. .................. 709/224 |
| 2007/0100735 A1 | 5/2007 | Kemp et al. |
| 2007/0250433 A1 | 10/2007 | Bhat et al. |
| 2007/0250833 A1* | 10/2007 | Araujo et al. ..................... 718/1 |
| 2007/0260744 A1 | 11/2007 | Shenfiled |
| 2008/0089338 A1* | 4/2008 | Campbell et al. ............. 370/392 |
| 2008/0098392 A1* | 4/2008 | Wipfel et al. ..................... 718/1 |
| 2008/0126147 A1 | 5/2008 | Ang et al. |
| 2009/0024512 A1 | 1/2009 | Reid |
| 2009/0094316 A1* | 4/2009 | Chen et al. .................... 709/203 |
| 2009/0204961 A1* | 8/2009 | DeHaan et al. .................. 718/1 |
| 2009/0228390 A1 | 9/2009 | Burns et al. |

OTHER PUBLICATIONS

Ward et al. "A Web Services based Framework for Configuring Extensible SLA Management Systems" pp. 1-9. May 2005.

\* cited by examiner

Browser Window

Virtual Machine Provisioning System

| | |
|---|---|
| Virtual Machines | |
| My Virtual Machines | New Virtual Machine Lease Request |
| Request New Machine | To request a new virtual machine click on the name of the desired template from the list below. |

NY Research and Development Virtual Lab

| Template | Lease (Days) | Description |
|---|---|---|
| Omni 3.4 Dev WKC | 21 | 3.4 Developer Workstation (1 GB/20 GB Disk) |

DBE Virtual LAB

| Template | Lease (Days) | Description |
|---|---|---|
| DBE Omni 3.4.1 workstation small 7 | | |
| ▣ DBE Omni 3.2 Server | 31 | 3.2 Omni Server build (C/D Only) |

DTACC Virtual Lab

| Template | Lease (Days) | Description |
|---|---|---|
| ▣ Omni Server 3.2.0 Gold 8GB | 30 | Marked as 512MB RAM |
| Omni 3.3.1 Wkstn Dev Dyn 20GB | 30 | Std Apps; Marked: 512BM RAM, 120B HDD |
| ▣ Omni 3.4.1 Wkstn Dev DYN 20GB | 18 | Marked as 8GB HDD, 1024 MB RAM |
| Omni 3.3.1 Laptop Std Dyn 20 GB | 30 | |
| Omni 3.3.1 HP Eng Div Build Test | 30 | Visual Studio Net 2003 and IIS |
| Omni 3.3.1 Wkstn Std Dyn 20GB | 30 | Std Apps; Marked: 512BM RAM, 8GB HDD |
| Omni 3.4.1 Laptop Div Dyn 20GB | 30 | Std Apps; Marked: 512BM RAM, 12GB HDD |
| Omni 3.4.1 Wkstn Std Dyn 20GB | 30 | Std Apps; Marked: 512BM RAM, 8GB HDD |
| ▣ Omni Server 3.2.0 Gold 20GB | 30 | Marked as 512MB RAM |

Research and Development Virtual Lab

| Template | Lease (Days) | Description |
|---|---|---|
| ▣ Omni 3.2 Server 1GB/10GB | 30 | Omni 3.2 Server with 1GB Memory & 10GB disk |
| TestLab 3.4.1 Workstation | 14 | 3.4.1 Workstation (1GB RAM) |
| TestLab 3.4.1 Workstation | 3 | Omni 3.4.1 Workstation for testing |
| Omni Laptop | 5 | 3.4.0 (use script to make 341) |
| Omni 3.4 Demo Workstation | 1 | 3.4 Demo & Test (512MB RAM, Office 2003) |

| |
|---|
| Support |
| Work On Behalf Of |
| Group Admin |
| Virtual Machines |
| Pending Requests |
| Manage Templates ▶ |
| Enterprise Admin |
| Manage Groups ▶ |
| Manage Hosts |

Browser Window

*Virtual Machine Provisioning System*

Virtual Machines
My Virtual Machines
Request New Machine

Support
Work On Behalf Of

Group Admin
Virtual Machines
Pending Requests
Manage Templates ▶

Enterprise Admin
Manage Groups ▶
Manage Hosts

Confirm Virtual Machine Lease Request
You have requested a new virtual machine lease based on the template "Omni 3.2 Server 1GB/10GB"

The following custom properties are specified by this template.

| Name | Value |
|---|---|
| AddMachineOwnerToAdmins | Yes |
| AdminUser1 | csfb\lmullen2_mis |
| AdminUser2 | csfb\lmullen2 |
| AppSrv | Yes |
| BuildType | MS |
| Debug | False |
| DOMAIN | vmlab.rd.com |
| Email | leslie.muller@credit-suisse.com |
| InstallNetIQ | No |
| Language | 00000809 |
| PowerPath | Off |
| SecurityLevel | Normal |
| SFW | Off |

Specify any additional custom properties to pass with the request.

| Name | Value | |
|---|---|---|
| | | Add |

Press OK to confirm or cancel to return to previous page.

[ OK ]    [ Cancel ]

Browser Window 1600

*Virtual Machine Provisioning System*

| | |
|---|---|
| Virtual Machines | |
| My Virtual Machines | |
| Request New Machine | |

Search Virtual Machines

[          ]  [Search]

Support
| |
|---|
| Work On Behalf Of |

Group Admin
| |
|---|
| Virtual Machines |
| Pending Requests |
| Manage Templates ▲ |

Enterprise Admin
| |
|---|
| Manage Groups ▲ |
| Manage Hosts |

Results
At least 10 machines were found. Showing only the first 10.

| Machine Name | Status | Running | Expiry Date | Owner | Group | Host |
|---|---|---|---|---|---|---|
| VM12345678 ▲ | Active | Yes | Never | lmuller | Omni 3.2 Gold (test) | SLON99T10765 |
| VM12345679 ▲ | Active | Yes | Never | lmuller | STIC-AL Test | SLON99T10765 |
| VM12345680 ▲ | Active | Yes | Never | lmuller | Research and Development Virtual Lab | SLON99T10765 |
| VM12345681 ▲ | Active | Yes | Never | lmuller | Research and Development Virtual Lab | SLON99T10765 |
| VM12345682 ▲ | Active | Yes | Never | lmuller | Research and Development Virtual Lab | SLON99T10765 |
| VM12345683 ▲ | Active | Yes | Never | lmuller | Research and Development Virtual Lab | SLON99T10765 |
| VM12345684 ▲ | Active | Yes | Never | lmuller | Research and Development Virtual Lab | SLON99T10765 |
| VM12345685 ▲ | Active | Yes | Never | lmuller | Research and Development Virtual Lab | SLON99T10765 |
| VM12345686 ▲ | Active | Yes | Never | lmuller | Research and Development Virtual Lab | SLON99T10765 |
| VM12345687 ▲ | Active | Yes | Never | lmuller | Research and Development Virtual Lab | SLON99T10765 |

Browser Window

*Virtual Machine Provisioning System* — 1900

- Virtual Machines
- My Virtual Machines
- Request New Machine

ⓘ There are requests requiring your approval. Click here to view them.

- Support
- Work On Behalf Of

Search Virtual Machine Templates

[ Search ]

- Group Admin
- Virtual Machines
- Pending Requests
- Manage Templates ▶ | View Templates
- Enterprise Admin    | Create Template
- Manage Groups ▶
- Manage Hosts

Results

| Template Name | Group | Lease (Days) | Description |
|---|---|---|---|
| Omni 3.4.1 VS2005 ▶ | STTC – AL Test | 10 | TEST IMAGE Omni 3.4.1 Dev with VS2005 |
|   1GB/10GB ▶ | Research and Development Virtual Lab | 30 | Omni 3.2 Server with 1GB Memory & 10GB disk |
| TestLab 3.4.1 Workstation ▶ | Research and Development Virtual Lab | 14 | 3.4.1 Workstation (1GB RAM) |
| Omni 341 Office 2000 ▶ | STTC – AL Test | 5 | Omni 3.4.1 with Office 2000 |
| BuildLevel 98 with 30Gb Drive Test ▶ | STTC – AL Test | 2 | Agilesp Test |
| ⊗ Omni 3.2.0 Gold Server DYN32B ▶ | DTACC Virtual Lab | 30 | 20GB C 10GB D Marked as 9GB, 512MB RAM |
| Omni 3.2 Server ▶ | Omni 3.2 Gold (Test) | 5 | Simon's Omni 3.2 GOLD Test (London Servers) |
| DBE Omni 3.4.1 workstation small ▶ | DBE Virtual LAB | 7 | |
| 🔒⊗ zDONOTUSE-Omni 3.4.0 Workstation Std DYN5GB ▶ | DTACC Virtual Lab | 30 | 3.4 Workstation with Office 2003 (512MB RAM) |
| 🔒 Omni Server 3.2.0 Gold 8GB ▶ | DTACC Virtual Lab | 30 | Marked as 512MB RAM |
| Omni 3.3.1 Wkstn Dev Dyn 20GB ▶ | DTACC Virtual Lab | 30 | Std Apps; Marked 512MB RAM, 12GB HDD |
| Omni 341 Standard Apps ▶ | STTC – AL Test | 5 | Omni 341 Standard Apps (24/08/2005) |
| 🔒⊗ zDONOTUSE-Omni 3.4.0 Dev Wks 12GB DYN HDD ▶ | DTACC Virtual Lab | 30 | Marked as 8GB HDD, 1024 RAM Image for Phil Wheeler |

Browser Window

*Virtual Machine*
*Provisioning System*                                                                                    2000

Virtual Machines
My Virtual Machines
Request New Machine

ⓘ There are requests requiring your approval. Click here to view them.

Support
Work On Behalf Of

Provisioning Groups
Details of the current provisioning groups.

Group Admin
Virtual Machines
Pending Requests
Manage Templates ▸

Current Groups

| Group Name | Administrator | Description |
|---|---|---|
| STTC – AL Test ▲ | leslie.muller@credit-suisse.com | Test and Qualification Environment (Alistair Gillespie) |
| Gang Omni 3.2 Servers (RC3) ▲ | leslie.muller@credit-suisse.com | Simon Winter's test group for Omni 3.2 |
| DTACC Virtual Lab ▲ | leslie.muller@credit-suisse.com | DTACC Virtual Machine Testing Lab |

Enterprise Admin
Manage Groups ▸   | View Groups | Gold (Test) ▲ | leslie.muller@credit-suisse.com | Omni 3.2 Gold Test
Manage Hosts      | Create Group | al LAB ▲ | leslie.muller@credit-suisse.com | DBE Virtual LAB lopment Virtual Lab ▲ leslie.muller@credit-suisse.com  Research and Development Virtual Lab in NY

| Research and Development Virtual Lab ▲ | leslie.muller@credit-suisse.com | R&D Virtual lab and VDE Demo |
| R&D Computer LAB ▲ | leslie.muller@credit-suisse.com | |
| NY R & D Lab Engenera ▲ | leslie.muller@credit-suisse.com | Egenera blade in R&D lab |

| Browser Window | | 2400 |
|---|---|---|
| *Virtual Machine Provisioning System* | | |

Virtual Machines
My Virtual Machines
Request New Machine

ⓘ There are requests requiring your approval. Click here to view them.

Support

Edit Virtual Machine Template
Change the virtual machine template using the form below.

Work On Behalf Of — Request new virtual machine

Group Admin
Virtual Machines
Pending Requests
Manage Templates ▲

Details

| | | |
|---|---|---|
| Template Name | Omni 3.2 Server | |
| Description | Omni 3.2 Production Server in Main Lab | ◄ ▬ ► |

Enterprise Admin
Manage Groups ▲
Manage Hosts

| | |
|---|---|
| Memory Size (Mb) | 1024 |
| Disk Size (Mb) | 17000 |
| VHD Path ( ) | \\omni32test\VHD\VM |
| Tombstone (Days) | 1 |
| Lease (Days) | 5 |
| Enabled | ☑ |
| Requires Approval | ☐ |
| Group | Omni 3.2 Gold (Test) ▸ |

| Custom Properties | Name | Value | | |
|---|---|---|---|---|
| | AddMachineOwnerToAdmina | Yes | Edit | Delete |
| | AdminUser1 | engineering admin | Edit | Delete |
| | AppSrv | Yes | Edit | Delete |
| | BuildType | MS | Edit | Delete |
| | Debug | False | Edit | Delete |
| | Email | lm@credit-suisse.com | Edit | Delete |
| | InstallNetIQ | No | Edit | Delete |

METHOD AND SYSTEM FOR MANAGING VIRTUAL AND REAL MACHINES

RELATED APPLICATIONS

The patent application is a continuation of U.S. patent application Ser. No. 11/903,374, entitled Method and System for Managing Virtual and Real Machines, filed Sep. 21, 2007, now U.S. Pat. No. 8,171,485 which claims priority under 35 U.S.C. §119 to U.S. Provisional Patent Application No. 60/919,965, entitled Method and System for Managing Virtual and Real Machines, filed Mar. 26, 2007, the complete disclosure of which each is hereby fully incorporated herein by reference.

FIELD OF THE INVENTION

This invention relates to systems and methods for managing virtual and real machines. More particularly, this invention relates to providing the infrastructure and processes for managing the lifecycle of virtual and real machines over multiple platforms, including virtual resources such as storage and virtual networks.

BACKGROUND OF THE INVENTION

Computer networks and other computer infrastructure provide the backbone for corporate and government institutions today. Computer assets represent significant investments of time and money for these institutions, in the procurement, operation, and maintenance of these assets. These assess require significant power resources to run and cool the machines. The assets also require continuous upgrading of software, including system patches and anti-virus programs. Maintenance demands require system personnel dedicated to keeping the assets up-to-date and operating.

Computer software developers require access to computer assets to test software under development. These development activities often require different computer configurations to ensure that the software is adequately tested. Often, to ensure that they have adequate platforms to test software, these developers maintain multiple workstations. Each workstation requires capital investment and significant maintenance costs and is often used a fraction of the time only.

This demand by software developers for different types of machines for short periods of time helped drive the development of virtualization. Virtualization allows for multiple platforms to reside on a single computer. That is, multiple virtual machines could reside on a single real machine. Although virtualization was supported on both individual work stations and servers, the emphasis of this development was on the work station, which was the more typical computer resource used by developers.

Even with tools that support virtualization on work stations, the work station approach still had deficiencies, particularly for large enterprises. First, a single work station was still a minimal environment. A work station would quickly run out of computing power and, as such, support a minimal number of virtual machines. A developer may still require multiple work stations to effectively test a software program. Also, large enterprises generally maintain strict controls over their computer networks. Individual end users generally did not have the proper permission to add machines on the network, even virtual machines. These restrictions were necessary to protect other computer assets on the network. Also, since the "hard drive" of a virtual machine is merely a file, these machines posed a security risk. An individual could walk off with a machine by copying the hard drive file from a work station to a portable storage unit, such as a memory stick or CD. So, even with the needed tools to create virtual machines on work stations, the end users could not use these machines.

One approach to overcome the problem of individuals within a large enterprise needing permission to connect virtual machines to the network and the ineffectiveness of work stations to run the tests would be to move the virtual machines into the data centers of the enterprises, that is, put the machines on the servers in the central data centers. A server could host many individual virtual machines. This approach was cost prohibitive at first, but the advent of inexpensive server-based virtualization software made the virtualization process cost-effective (ignoring the other costs associated with maintaining virtual machines). Although this approach would enable the system administrators to control access to the network, this approach would dramatically increase the work load of these administrators. They would need to create and destroy these machines. Creating the machines would require adding a suite of software to the machines, all of which require licenses. Once created, each machine would need to be maintained, including anti-virus updates and software patches—maintaining virtual machines in this respect is no different from maintaining real machines. Also, for enterprises where specific profit centers "own" the physical host in a data center, virtual machines could allow individuals from one profit center to use an asset paid for by another profit center.

Although software developers are one group of end users that can benefit from virtualization, enterprises as a whole may benefit as well. Through virtualization, these enterprises can maximize their computer assets and better manage their capital expenditures. For example, computer assets allocated to disaster recovery can host virtual machines during normal operations and then quickly be converted for disaster recovery use by destroying the virtual machines.

In view of the foregoing, there is a need to provide systems and methods that can allow end users to access virtual machines resident in a data center and provide administrators with entire control over the machines while minimizing the work required by the administrators to create and destroy the machine and minimizing the costs associated with the machine.

SUMMARY OF THE INVENTION

The present invention provides systems and methods that provides a self-service mechanism where end users can activate and use virtual machines housed in a data center and an administrative mechanism that gives system administrators control over the machines. One aspect of the present invention provides a system for managing virtual computer resources. The system includes a provisioning module operable to receive a request to act on a virtual resource and automatically generate instructions to implement the request and further operable to dynamically monitor the virtual resource; and a plurality of physical hosts each comprising one or more virtual resources and each associated with an agent, wherein the agent is logically connected to the provisioning module and operable to receive the instructions and to act on the virtual resource in response to the request and further operable to dynamically provide the status of the virtual resource.

Another aspect of the present invention provides a system for managing virtual computer resources. The system includes a provisioning module operable to receive a request to act on a virtual resource and automatically generate instructions to implement the request; a workflow engine, logically connected to the provisioning module and operable to instantiate a workflow in response to the request to control the lifecycle of the virtual resource; one or more templates comprising a configuration for a virtual resource, wherein the received request corresponds to a template and further comprising an allocation of physical resources associated with a plurality of physical hosts; and the plurality of physical hosts each comprising one or more virtual resources and each associated with an agent, wherein the agent is logically connected to the provisioning module and operable to receive the instructions and to act on the virtual resource in response to the request.

Yet another aspect of the present invention provides a method for controlling computer resources. The method includes the steps of: a) presenting a user interface to an end user comprising one or more controls for submitting requests for actions on a computer resource; b) receiving a request for an action on a computer resource; c) automatically instructing an agent associated with one of a plurality of physical hosts in response to receiving the request, wherein the instruction comprises an action associated with the request; and d) receiving status information on the computer resource.

Yet another aspect of the present invention provides a system for managing computer resources. The system includes a provisioning module operable to receive a request to act on a computer resource and automatically generate instructions to implement the request and further operable to dynamically monitor the computer resource; and a plurality of physical hosts each comprising one or more computer resources and each associated with an agent, wherein the agent is logically connected to the provisioning module and operable to receive the instructions and to act on the computer resource in response to the request and further operable to dynamically provide the status of the computer resource.

BRIEF DESCRIPTION OF THE DRAWINGS

FIGS. 12*a-m* depict illustrative computer screens from a graphical user interface in accordance with an exemplary embodiment of the present invention.

DETAILED DESCRIPTION OF THE EXEMPLARY EMBODIMENTS

Exemplary embodiments of the present invention provide systems and methods that provide a self-service mechanism where end users can activate and use virtual machines housed in a data center and an administrative mechanism that gives system administrators control over the machines. Exemplary systems employ a web portal to allow users to access the system to create and use virtual machines and manage these machines. The lifecycle of these machines are managed through workflows, which allow for a simple process control environment. Further, the system includes a robust database structure. The system also employs agents on physical hosts (or proxy servers associated with the physical hosts) to control the variety of virtual machines that may be created.

Figure 1:
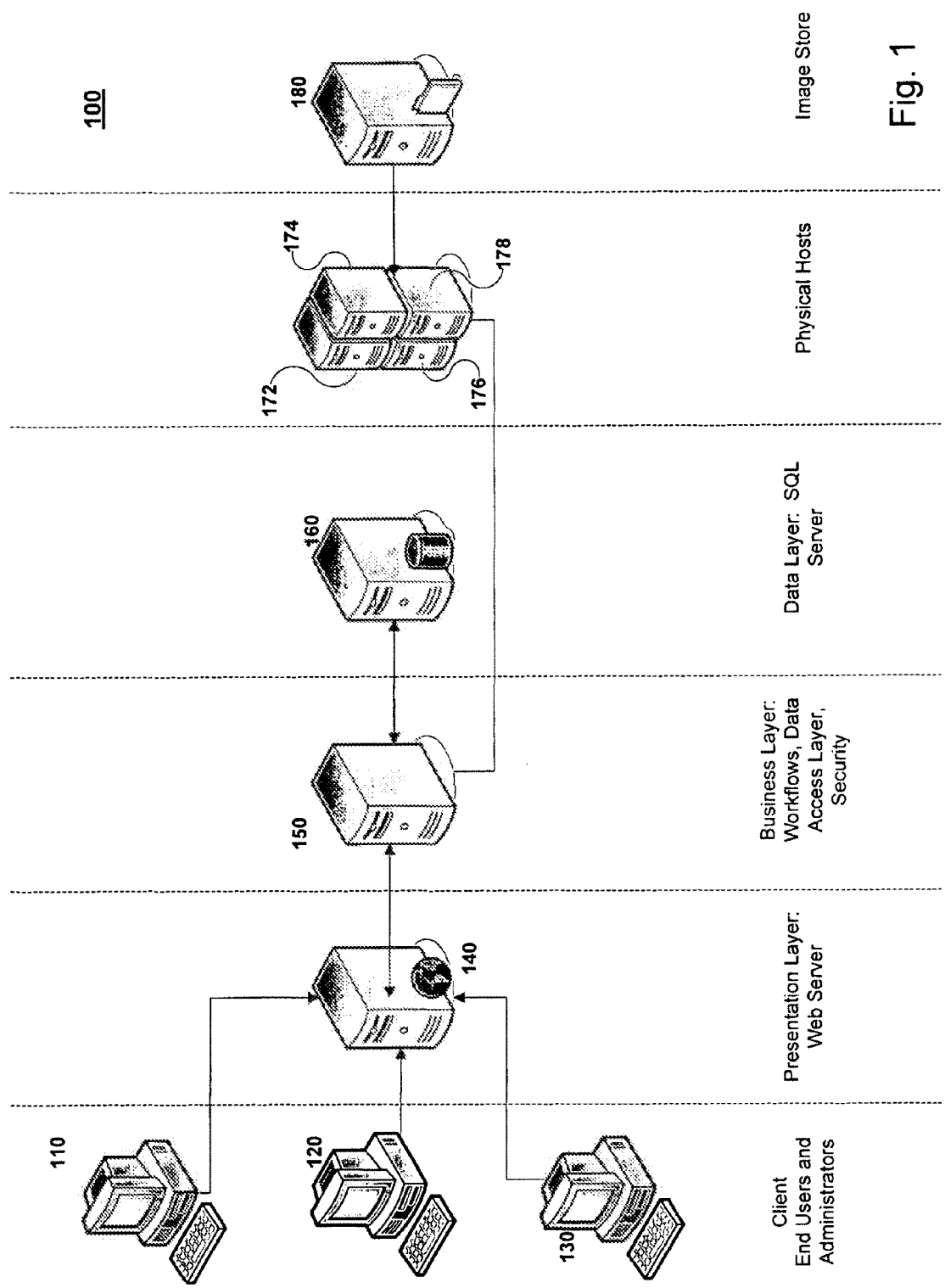
FIG. 1 depicts an operating environment in accordance with an exemplary embodiment of the present invention.

FIG. 1 depicts an operating environment 100 in accordance with an exemplary embodiment of the present invention. Referring to FIG. 1, the exemplary operating environment 100 consists of a typical layered system, including a presentation layer, a business layer, and a data layer. A set of client computers 110, 120, 130 access a web services server 140 representing a presentation layer. The client computers 110, 120, 130 run a web browser, which enables a user to access information stored on the web services server 140. The web services server 140 renders web pages to users according to the specific user. For example, end users of a virtual machine that are creating or modifying a virtual machine would see one type of web pages. These pages may be tailored to an end user, based on that end user's membership in a logical group. Administrators would see other web pages served by the web services server 140, such as pages that would allow the administrators to manage group and enterprise virtual or real computer assets.

A business layer would provide workflows, security, and data access, through one or more servers, such as server 150. Server 150 hosts the processes necessary to manage the lifecycle of virtual or real machines, or other virtual or real resources, such as storage resources or network resources. Storage resources may include hard drives on work stations, computers on networks dedicated for storage, or massive array network of computers for storage. Network resources includes physical network components and network connections. These processes allow for the provisioning, maintenance, and destruction of the machines. Also, a security module, resident on the server 150, controls what processes a specific user may access. This business layer is referred to hereinafter at a provisioning system or a virtual machine provisioning system, since the system manages resources and privileges for the virtual machines.

Virtual machines would live on physical hosts, such as physical hosts 172, 174, 176, 178. One physical host may be configured to operate a specific type of virtual machine or resource. So, physical host 172 may operate a MICROSOFT WINDOWS-base virtual machine while physical host 174 may operate a UNIX-based virtual machine. The virtual machine can be in the form of an individual workstation, a server, or a network of machines. Typically, a physical host would run a specific virtualization program, such as MICROSOFT'S VIRTUAL SERVER or VWWARE's virtualization program. A file server 180 includes images of the software that would be loaded onto the virtual machines. That is, the file server 180 would have images of different combinations of software that correspond to a specific type of virtual machine, such that when the virtual machine is created, the software is copied from the file server 180 into the physical host that is hosting that virtual machine.

A data layer provides a data store, such as a SQL server 160, that provides data needed by the business layer resident on server 150. For example, the data may include workflows that manage the states of a machine, configurations of virtual machines, and configurations of physical hosts.

The operating environment 100 provides an infrastructure that allows for the dynamic evaluation of all virtual and physical resources. The provisioning system can evaluate current use of resources, both real and virtual. This dynamic accounting of resource use allows for allocating costs of system use that closely tract actual use of resources. Also, the ability for end users to create and manage real and virtual resources, without relying on administrators to perform many of the functions, allows for just-in-time provisioning of physical and virtual resources, which minimizes the inefficient use of machines. For example, an enterprise would not need to set aside a large number of machines or storage space for a group in anticipation of that group ramping up its use of the computer resources. Instead, the group can access the resources as needed. In this way, the group need pay for the resources actually used only.

Figure 2:
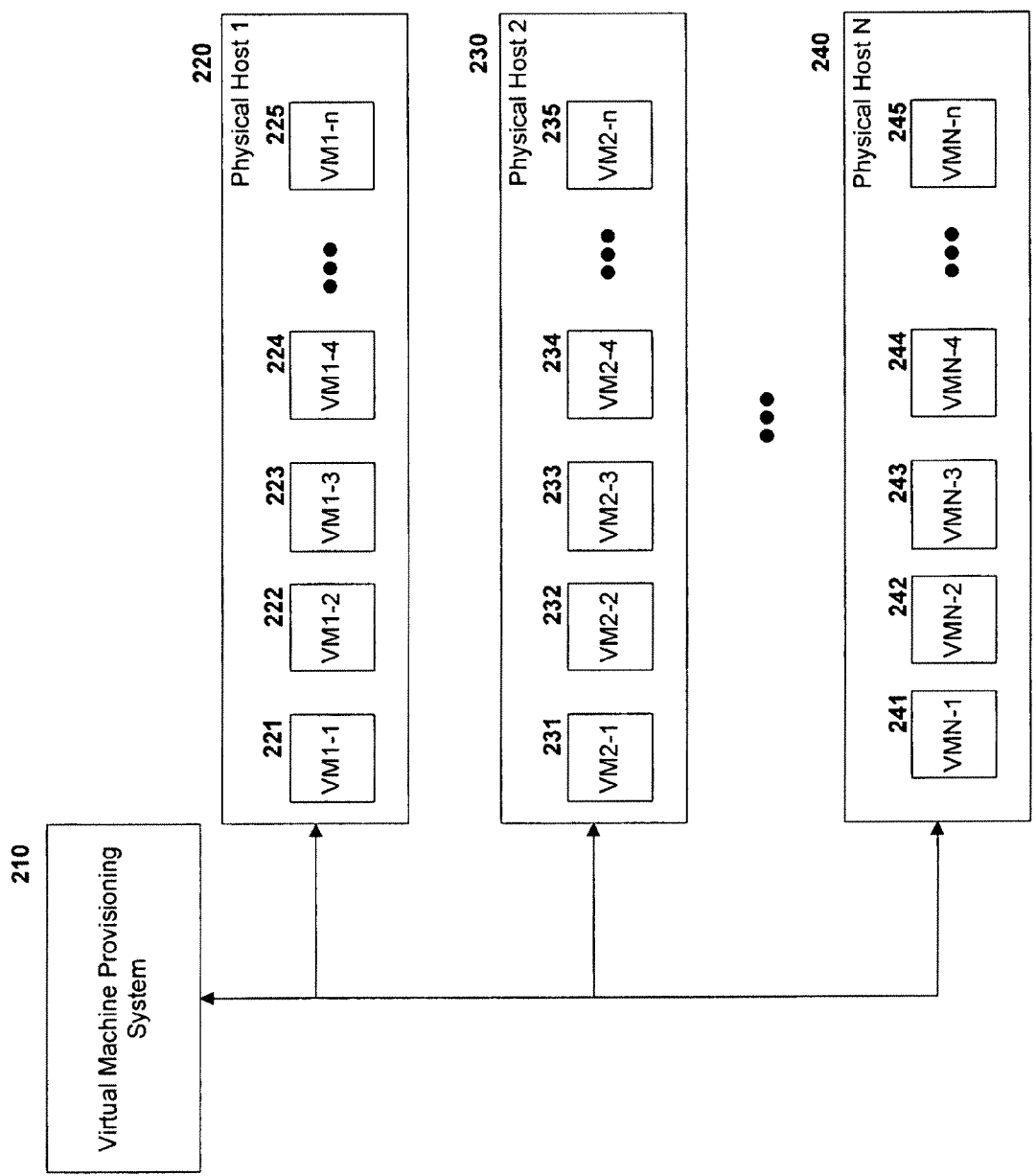
FIG. 2 depicts an arrangement of virtual machines within physical host structures in accordance with an exemplary embodiment of the present invention.

FIG. 2 depicts an arrangement of virtual machines within physical host structures in accordance with an exemplary embodiment of the present invention.

Referring to FIGS. 1 and 2, a virtual machine provisioning system 210 interacts with one or more physical hosts, such as physical hosts 172, 174, 176, 178. Each physical host will include a system structure to support virtual machines. For example, physical host 172 may include physical host structure 220. Similarly, physical host 174 may include physical host structure 230. The virtual machine provisioning system 210 can interact with any number of physical host structures, as depicted in FIG. 2 by physical structure 240, resident on the Nth physical host. In other words, the virtual machine provisioning system 210 does not impose limits on the number of physical hosts that can be managed. One of ordinary skill in the art would understand that the virtual machine provisioning system 210 can manage physical hosts that are located in multiple physical locations.

Each physical host structure may supports multiple virtual machines. As discussed above in reference to FIG. 1, typically a single physical host structure, such as physical host structure 220 resident on physical host 172, would run one type of virtualization software, such as VMWARE. Also, all of the virtual machines resident on the physical host structure would be based on the same operating system for the virtual machine. For example, physical host structure 220 may operate VMWARE's virtualization program and virtual machines 221, 222, 223, 224, 225 may be UNIX-based machines. In contrast, physical host structure 230 may operate MICROSOFT'S VIRTUAL SERVER program and virtual machines 231, 232, 233, 234, 235 may be MICROSOFT WINDOWS-based machines. The number of virtual machines that may reside on a single physical host depends on the type of virtual machines established on the host, the size of the host, and the host resources allocated to virtual machines.

Figure 3:
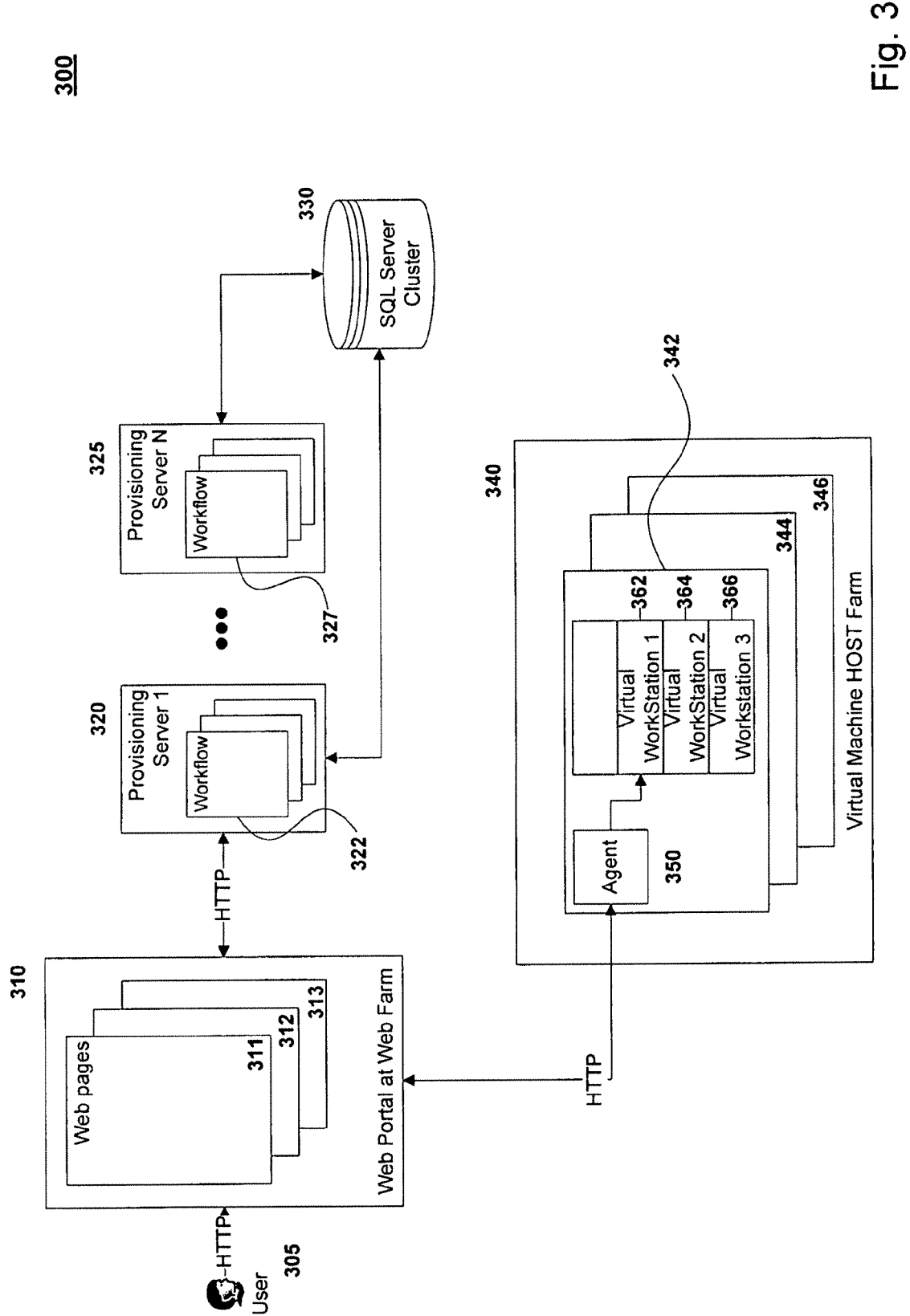
FIG. 3 depicts an operating environment in accordance with an exemplary embodiment of the present invention including modules that support system functionality.

FIG. 3 depicts an operating environment 300 in accordance with an exemplary embodiment of the present invention including modules that support system functionality. Referring to FIGS. 1 and 3, a user 305, using a web browser application, accesses web pages 311, 312, 313 resident on a web farm 310, that is, one or more web servers that host the web pages. One of ordinary skill in the art would understand that the web farm may host a variety of web pages, including pages that are unrelated to managing virtual machines. One of ordinary skill in the art would also understand that other means, such as a more robust client program, could be used instead of a web browser or the interface between the user and the provisioning system may employ a command line structure. Illustrative web pages are described below, in connection with FIGS. 12a-n.

Information and options rendered on web pages 311, 312, 313 are sent to a web server, such as web server 140, by one or more provisioning server modules 320, 325, resident on one or more servers, such as server 150. These servers run workflows 322, 327 that, in conjunction with a security module (not depicted), dictate the options available to the user 305 through the web pages. The workflows 322, 327 of this exemplary embodiment are stored in a SQL server cluster 330. An instance of a workflow would be instantiated in response to a request, such as a request from the user 305 that the user 305 wants to create a virtual machine. A specific workflow would be instantiated to govern a specific task.

The workflows 322, 327 running on the provisioning server modules 320, 325 also control agents, such as agent 350, resident on physical hosts. Each physical host would have a single agent running on it. Alternatively, the agent may reside on a proxy server and interact with the physical host and virtual machines on that host remotely. These agents control virtual machines that reside on these physical hosts, such as virtual workstations 362, 364, 366 resident on physical host 342. In one embodiment, these workflows 322, 327 push instructions to agents resident on the hosts through a web server, such as web server 140. These instructions encompass each aspect of the virtual machine's lifecycle. A virtual machine's lifecycle is discussed in greater detail below, in connection with FIGS. 8 and 9. Alternatively, the agent would periodically poll, through the web server, the provisioning server module to receive instructions regarding the hosted virtual machines.

The single agent resident on a single host is designed to interact with the Application Programming Interfaces (APIs) specific to the virtualization software resident on the server. As such, the physical host has a single agent and operates a single virtualization software program. Through this interaction with the APIs, the agent manages all aspects of a virtual machine, its characteristics (e.g., CPU, memory, storage) or other virtual resource or network of resources resident on that physical host, based on the instructions it receives from the workflows 322, 327 operating provisional server modules 320, 325.

In one embodiment, the agent 350 would poll the provisioning server modules 320, 325 with two inquiries. One inquiry would be: what is the state of virtual machines on physical host 342? This inquiry allows the agent 350 to ensure that its physical host 342 mirrors the configuration that the provisioning server modules 320, 325 believes is in place. The agent 350 periodically synchronizes its physical host 342 with the configuration maintained by the provisioning server modules 320, 325. The second inquiry would be: what task do you have for me? This inquiry enables the agent 350 to be instructed to manage a virtual machine—create it, maintain it, expire it, and destroy it. By having the agent 350 poll the provisioning server modules 320, 325, the system can be assured that the agent 350 receives the instruction. This polling process avoids the need for a queuing mechanism at the agent under a system that pushes instructions to an agent. Although this polling aspect has this advantage over a push model, one of ordinary skill in the art would appreciate that a push model can be readily employed.

Figure 4:
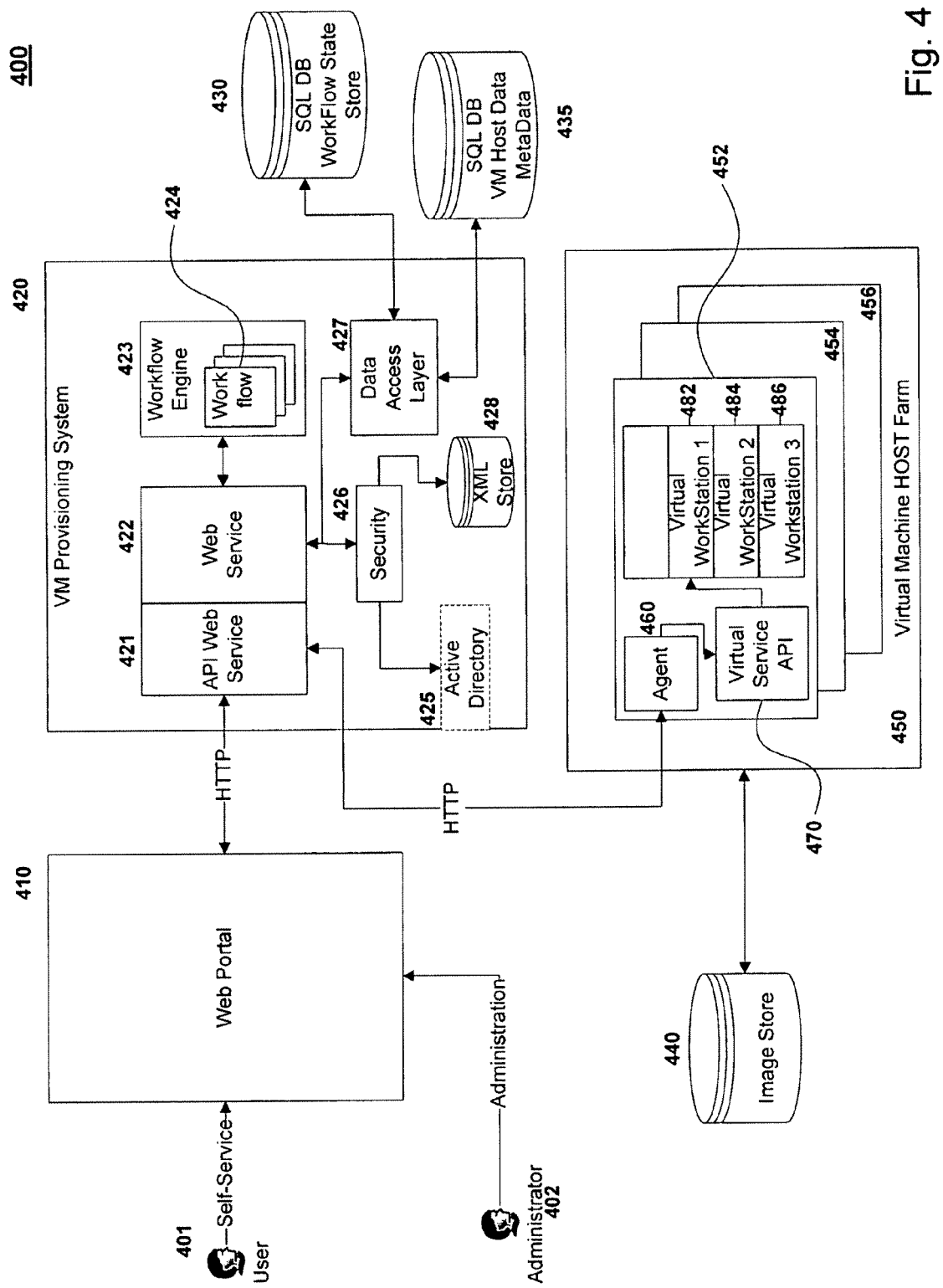
FIG. 4 depicts an operating environment in accordance with an exemplary embodiment of the present invention including modules that support system functionality.

FIG. 4 depicts an alternative operating environment 400 in accordance with an exemplary embodiment of the present invention including modules that support system functionality. Referring to FIGS. 1 and 4, an administrator 402 and an end user 401 accesses the provisioning system 420 through a common web portal 410. Alternatively, the administrator 402 and end user 401 may access the system through different web servers.

In this exemplary embodiment, the provisioning system 420 includes an API web services module 421 and a web service 422. The API web services module 421 interacts with the web portal 410 and the agent 460. In this way, the operating environment 400 differs from the exemplary embodiment of operating system 300, which included a web farm of web servers that served as a conduit for information to user interfaces and to the agents resident on physical hosts.

A workflow engine 423 includes workflows, such as workflow 424, and interacts with the web service module 422. Through this interaction, the workflow engine 423 receives requests from the user 401 and the administrator 402 submitted through web-based forms and provides instructions that will be implemented by an agent resident on a physical host, such as agent 460. The workflow engine 423 would also access data access layer 427 through the web server module 422. The data access layer 427 then accesses a SQL database containing workflow states and a SQL database that includes virtual machine host data and metadata. One of ordinary skill in the art would appreciate that the data access layer 427 could access a single collective database or distributed databases.

A database 430 stores the "state" of current workflows. Since a single instance of a workflow exists during the lifetime of a virtual or real resource and typically a lifecycle includes gaps in time when the provisioning system 420 is not doing anything as to the resource, the database 430 stores the current state of that workflow—where the workflow is in its lifecycle. By storing the state in a database, the workflow instance does not have to be maintained in memory. Also, redundancies can be established to protect against the loss the state of a resource if a computer system fails. The database 430 would include an XML description of the workflow and the code of the workflow. Since the code for each instance of a workflow is stored in the database, each instance of a workflow, even if for the same resource, can exist in different versions. So, an instance of a workflow for a specific resource can be in the middle of its lifecycle and another instance of the same workflow can be instantiated, where this second instance is a later version with different operations. In this way, the provisioning system 420 can continually update the management tasks, without affecting previously provisioned resources.

A database 435 stores other data used by the provisioning system 420. These data include names of physical and virtual resources, templates, groups, reservations, allocations, and the status of each resource. Queries to the database 435 provides an instant snapshot of the use of all real and virtual resources. As such, an enterprise can determine a precise measure of resource use and can allocate costs as appropriate. The database 435 also includes an audit trail—every action taken by a user, administrator, and workflow is recorded and stored in the database 435.

The exemplary security module 426 is fine grained. The security module 426 controls what parameters an end user, such as end user 401, can control for a specific virtual machine and these parameters could vary by groups of users or individual users. For example, one type of user may not be allowed to turn off their virtual machines because regulatory requirements may mandate that the machines remain on to protect forensic data. The security module 426 affects what information and options are rendered on the web page shown to the user 401, thus controlling the options available to that user. The XML store 428 includes security roles and descriptions. It includes, in XML form, definitions of each role (see FIG. 6 below, for a discussion of roles), task, and operation that can be performed on the provisioning system 420. It maps to the active directory 425. The active directory 425 includes the security authorization identity (e.g., username and password) for each user, security groupings for users, and information on each active virtual and real computer resource.

An image store 440, which may reside on a server such as file server 180, includes the images for the types of virtual machines that can be created. An image is a copy of the software and associated data that forms a machine's hard drive. Through the use of the image store, specific configurations of software can be copies to the storage drives of the physical hosts that represent a virtual machine. For example, the physical host 452 operates VMWARE. The agent 460, which may reside on physical host 452, receives instructions from the provisioning system 420 to create a virtual machine. Alternatively, the agent 460 may reside on a proxy server and interact with the physical host 452 and virtual machines on that physical host 452 remotely. The instructions include details on the type of machine to be created, such as memory and storage characteristics. The agent 460 would interact with the image store 440 to copy the image of the software that defines the virtual machine onto a hard drive for the physical host 452. The image may be for virtual workstations, such as virtual workstation 482, 484, 486, or a virtual server (not shown).

The agent 460 also interacts through a virtual service API 470. The virtual service API 470 is the interface for the agent to communicate with the virtualization software running on the physical host 452. The virtual service API 470 would be unique to a type of virtualization software and the agent 460 would be designed to interact with that specific The virtual service API 470. Physical hosts 454, 456 may run different virtualization software from physical host 452 and, as such, would have different agents and virtual service APIs (not shown). In this way, a virtual machine host farm 450 may operate diverse virtualization software and host diverse virtual machines. Indeed, the virtual machine host farm 450 may be in physically diverse places, such that a set of physical hosts resides in one location and another set resides in a different location. These distributed hosts would be connected to the provisioning system 420 through a communications link, such as over the internet.

Typically, the user 401 can request the creation of a virtual machine, extend or end a lease of a virtual machine, and otherwise manage virtual machines that the user 401 has created. In an exemplary embodiment, the creation of virtual machines is facilitated by the use of templates. Templates are discussed in greater detail below, in connection with FIG. 6. The provisioning system 420 can interact with an agent, such as agent 460, to create and manage virtual resources other than virtual machines, such as virtual storage and virtual networks (multiple virtual machines networked together).

Although FIG. 4 is directed at managing virtual machines, the system for managing real computer resources, such as storage or network resources, is comparable. Users and administrators, such as user 401 or administrator 402, access the provisioning system 420 to manage a physical computer resource. The provisioning system 420 interacts with a physical machine that includes the physical resource. As with virtualization described above, the provisioning system 420 interfaces, through agents, with APIs that reside on the physical computers and that control the physical resources. For example, the user 401 may access the provisioning system 420 to create a logical unit number (LUN), a "slice" of storage on a massive array network of computers used for storage. The user 401 can create the LUN, map the LUN to a network, and manage the lifecycle of the LUN. As with virtual machines, this management is performed through a workflow specific to the task. The workflow would send instructions to an agent that is designed to interact with the specific API and translate the instructions from the user 401. Templates may be used that identify the types of physical computer resources that the user 401 can create and manage. As with virtual machines, the types of tasks that the user 401 can perform would be controlled by the security module 426.

Figure 5:
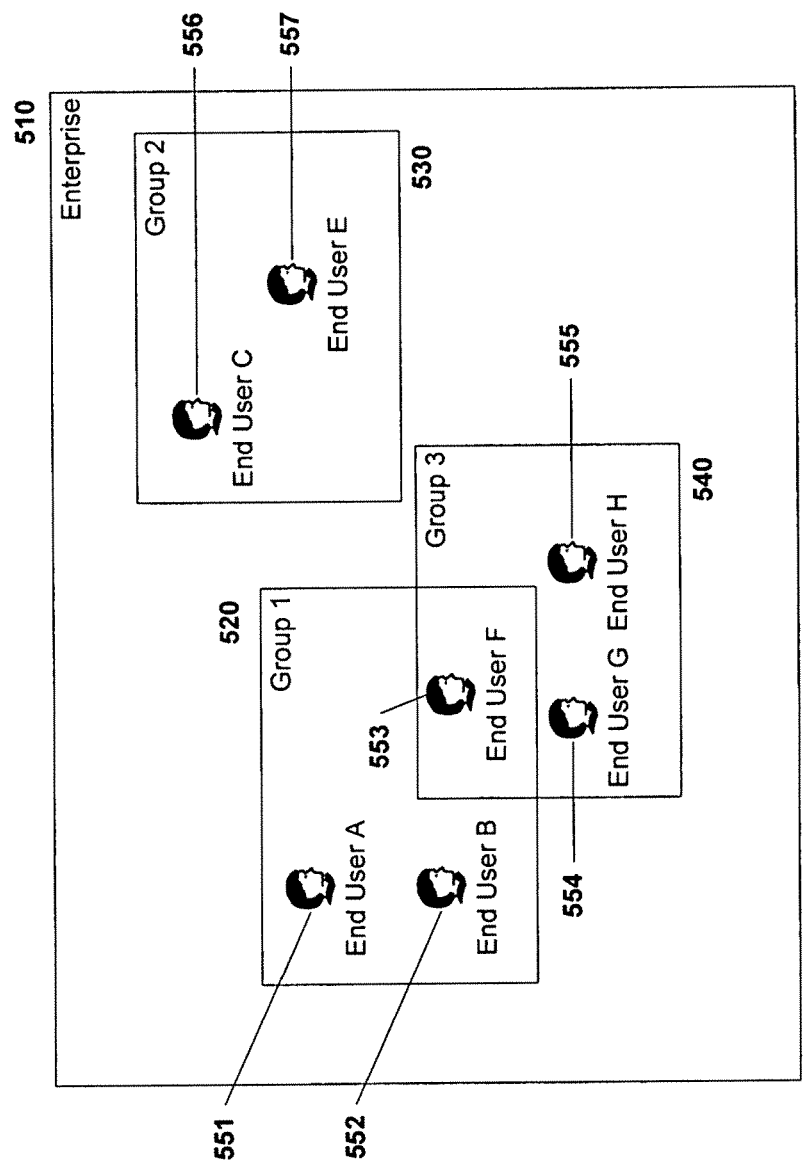
FIG. 5 depicts a user hierarchy in accordance with an exemplary embodiment of the present invention.

FIG. 5 depicts a user hierarchy 500 in accordance with an exemplary embodiment of the present invention. Referring to FIG. 5, in this exemplary embodiment, three levels are depicted. An enterprise level 510 consists of one or more groups, such as group 520, group 530, and group 540. Each group may have access to different resources; that is, members of one group may be able to create different virtual machines with different configurations and lifetimes as compared to members of another group. These groups are logical groupings of resources that are reserved for use by group members. End users would be in one or more groups. For example, end user A 551, end user B 552 and end user F 553 comprise group 520 while end user G 554, end user H 555 and end user F 553 comprise group 540. In this example, end user F 553 would have access to the resources allocated to both group 520 and group 540. In contrast, end user A 551 and end user B 552 would have access to group 520 resources only; end user G 554 and end user H 555 would have access to group 540 resources only; and end user C 556 and end user E 557 would have access to group 530 resources only.

In the user hierarchy 500, one or more enterprise administrators would administer to the resources of the enterprise 510. Additionally, each group may have one or more administrators to administer the resources of the individual groups.

Figure 6:
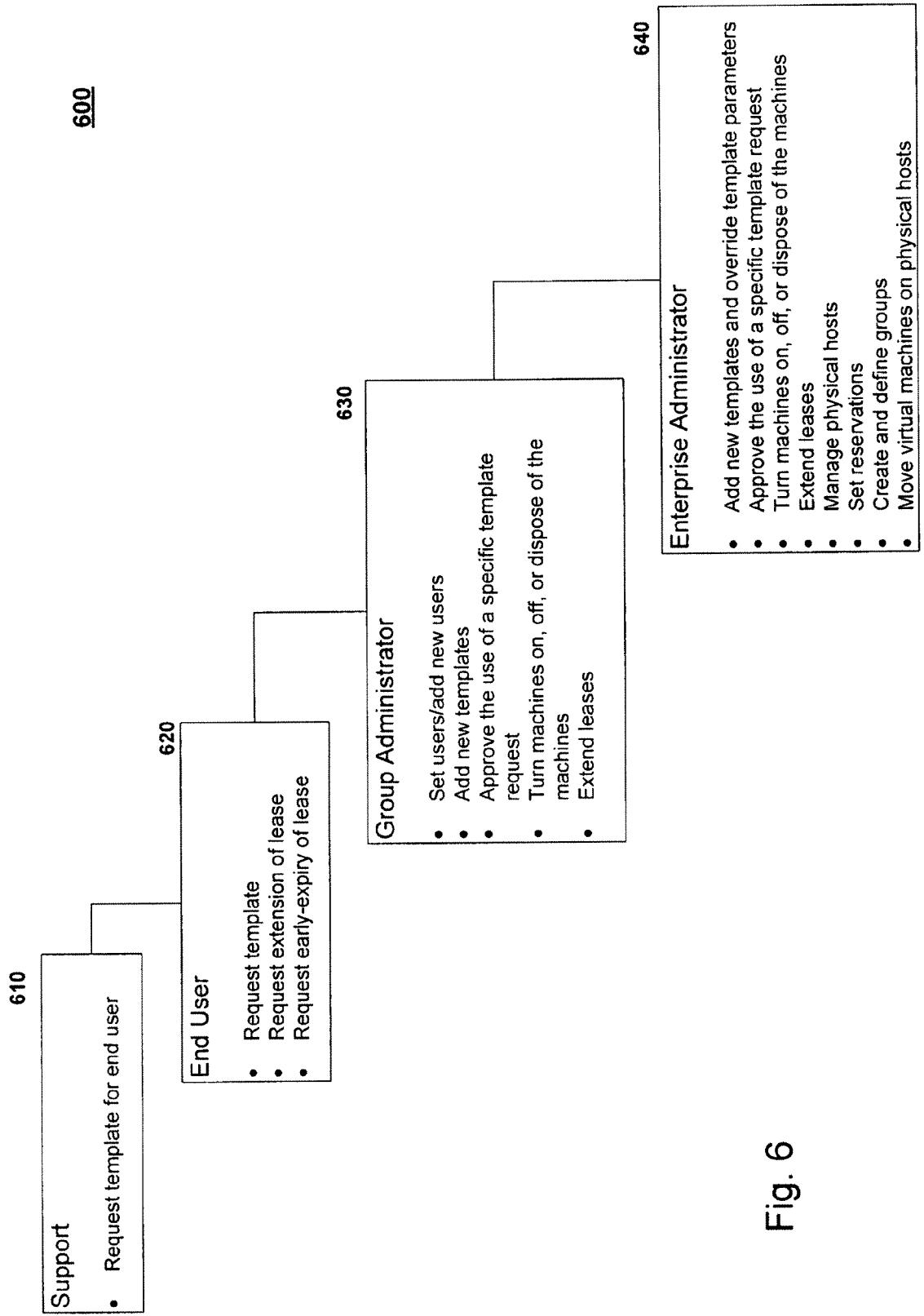
FIG. 6 presents roles for logical groups in accordance with an exemplary embodiment of the present invention.

FIG. 6 presents roles for system members in accordance with an exemplary embodiment of the present invention. Referring to FIGS. 5 and 6, a role 610 is that of a support person. The support person is designated by an end user to create a virtual machine for that end user. For example, end user A 551 may designate an administrative assistant to request templates for the end user 551. Another role is that of an end user, such as end user A 551. In this exemplary embodiment, an end user can create a virtual machine, extend the lease of a machine, and request the early expiration of a machine that the end user finishes with before the schedule expiry date, to release resources for another user.

The exemplary provisioning system uses templates to define the virtual machines that an end user may create. A template is the definition of a virtual machine or allocation of a physical resource, such as a LUN or type of network connection, for virtual resources, the template specifies a storages space, computer memory allocation, and required software. The template also specifies a lease duration. Some applications of virtual machines require a short duration, for example, for running a software test. By having templates that define short-term, disposable virtual machines, these machines can be created and destroyed within a patch cycle, reducing the cost of maintenance for the machine. Other templates may have longer durations or may define a permanent virtual machine. In this way, an end user chooses to create a specific type of machine. Typically, but not necessarily, the end user cannot override the allocation of resources in the template.

By limiting the number of templates that are available to a group or enterprise, the virtual machines can more easily be controlled. For example, a group administrator can more readily manage the resources allocated to the group by having specific, defined templates that used prescribed resources. Similarly, security breaches, such as a virus, may be contained by limiting the range of templates available and disposing of machines of a specific type of template that may be susceptible to an assault from a virus.

One of ordinary skill in the art would appreciate that a system could allow an unlimited number of templates or allow a requestor to set the parameters for the machine for each virtual machine request. This type of system would not benefit from the control that is provided by having specific, limited templates. Additionally, the system may allow the user to point to a specific group of physical machines and create a set of virtual machines that mirror the physical machines. In this case, the template process would be skipped and the characteristics of the actual machines would be bulk imported by the system to create the virtual machines.

A role 630 provides for a group administrator. The group administrator can add end users to a group, establish templates for the group, approve the use of a specific template request, turn machines on, off, or dispose of the machines, and extend leases, such as for group 520. For example, a specific template may require administrator approval. Approval may be based on the overall availability of resources in the group or projected upcoming need. Similarly, the administrator may have to approve the extension of a lease, given the status of the available resources.

A role 640 provides for an enterprise administrator, such as for enterprise 510. The enterprise administrator may do everything a group administrator can do. Enterprise administrators also manage physical hosts, set reservations, create and define groups, and may move virtual machines on physical hosts. Reservations are a combination of CPU, disk space, and memory allocated on a virtual server. Reservations are discussed in greater detail below, in connection with FIG. 7. Additionally, an enterprise administrator may be able to override the parameters in a template to allow an end user to access resources or otherwise configure a machine in a way that available templates would not allow.

Enterprise administrators can also query the status of all machines at any time. In that way, the administrator can quickly understand how resources are being used. The administrator may use this feature to determine the machines that may need a critical security patch. The administrator can also quickly maintain the system by destroying one, some, or all of the virtual machines. This action may be needed to protect other resources on the network, such as from a virus or may be needed to free resources for another application. Also, by being capable of moving virtual machines, the administrator can perform physical maintenance on a machine, such as upgrading its memory, without disrupting the virtual machines.

One of ordinary skill in the art would understand that other roles may be appropriate for an enterprise system and that the exemplary roles and privileges described above can be consolidated or otherwise structured differently.

Figure 7:
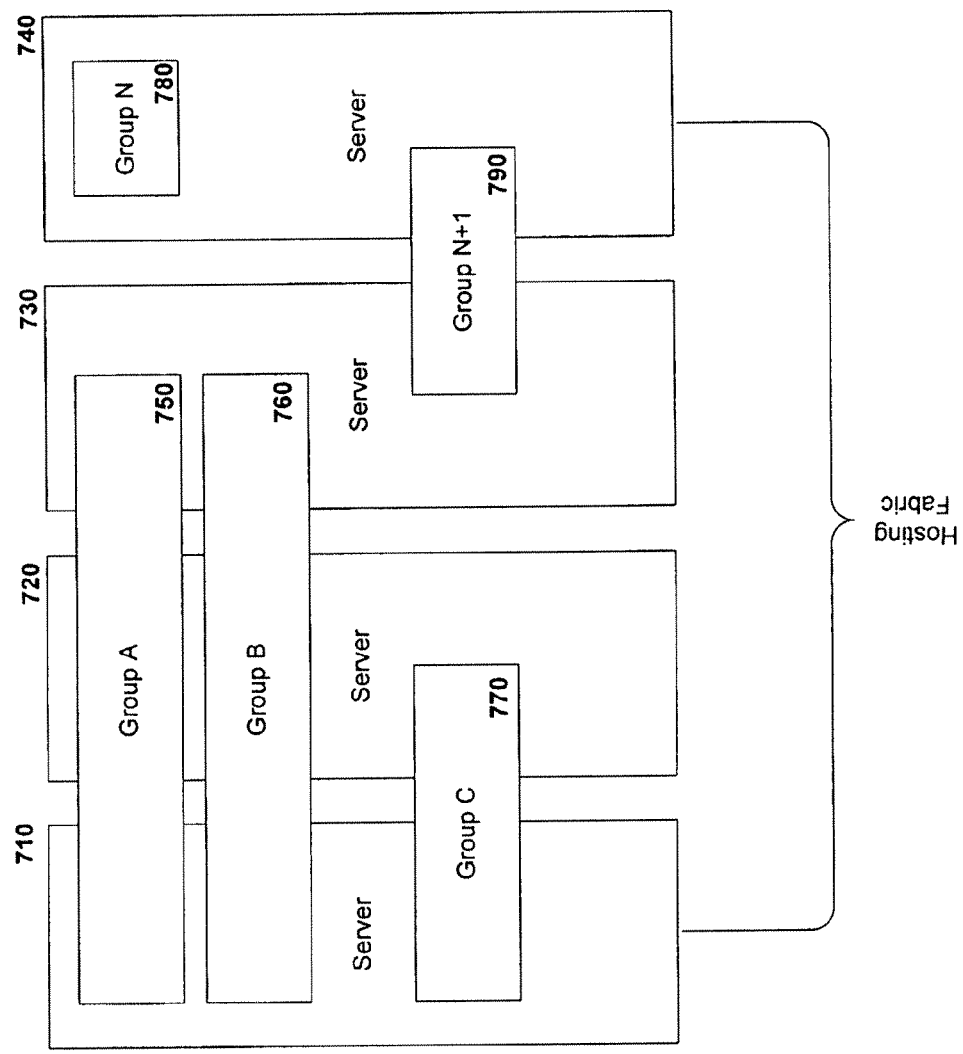
FIG. 7 depicts reservations for virtual machines on physical hosts in accordance with an exemplary embodiment of the present invention.

FIG. 7 depicts reservations for virtual machines on physical hosts in accordance with an exemplary embodiment of the present invention. Referring to FIG. 7, reservations allow for the efficient allocation of server resources to groups. For example, group A 750 and group B 760 both share portions of server 710, server 720, and server 730 while group C 770 has portions of two servers, server 710 and server 720. Reservations serve as the basis for defining the types of templates that a group may have, as the reservations define the total available resources. Of course, FIG. 7 shows one possible configuration of reservations. A single group could have all of the available resources of multiple servers while another group could have a portion of a single server. Also, a server may have some resources allocated for operations other than virtualization. Optimal use of these servers can be made by allowing unused resources of the server to be used for virtualization. Also, reservations allow an enterprise to effectively allocate the cost of a physical server based on the group or groups that have reservations on that server. Reservations may also be spliced as to CPU, memory, and storage space. In that way, some resources can be returned to the reservation pool when no longer needed by a virtual machine (such as CPU or memory) even if the virtual machine still requires other resources (such as disk storage).

Figure 8:
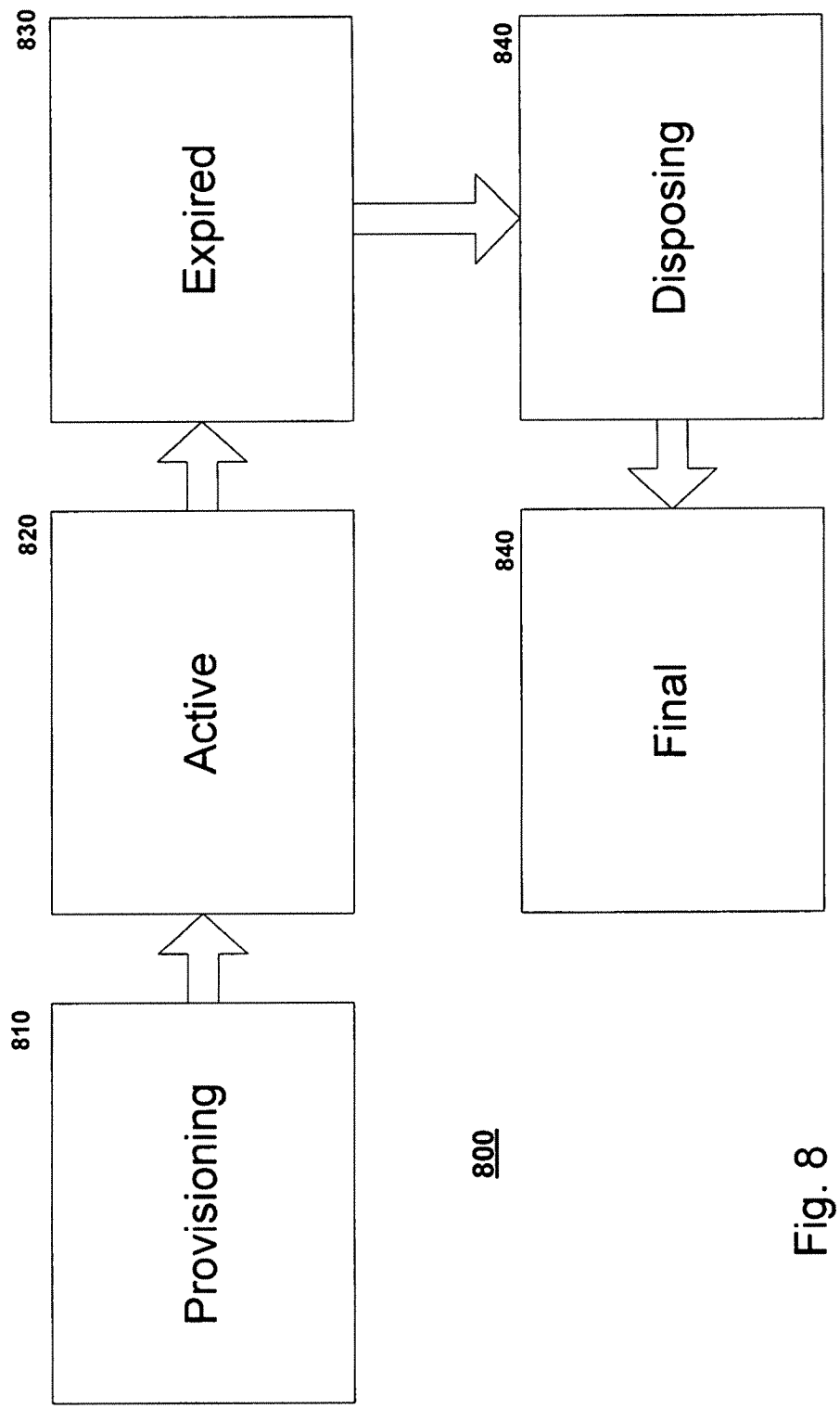
FIG. 8 depicts the states of a virtual machine in accordance with an exemplary embodiment of the present invention.

FIG. 8 depicts the states of a virtual machine in accordance with an exemplary embodiment of the present invention. Referring to FIG. 8, a state 810 is Provisioning. In the Provisioning state 810, a virtual machine is created. A workflow is instantiated that performs the sequential steps needed to place a virtual machine on a server, place the required software on the server, and to turn the machine on. A state 820 is Active. In the Active state 820, the virtual machine operates. The instantiated workflow, that is, the workflow instantiated during the Provisioning state 810, moves into the Active state 820. The workflow may have a variety of sequential flows associated with the workflow to dictate specific actions during the Active state 820. These actions may include maintaining software, such as updating anti virus software, and warning when an expiry date approaches. Also, Active state 820 workflows may differ from one another based on the type of virtual machine that is being controlled. In this way, the provisioning system can be employed to control a variety of types of virtual machines running on a variety of platforms.

Following the Active state 820, the machine moves into an Expired state 830. In the Expired state 830, the machine is turned off. However, in the Expired state 830, the machine is tombstoned, rather than immediately destroyed. During the tombstone period, the machine can be restarted and the lease extended. The tombstone period, for example 7 days, allows a user who may otherwise not have realized that the machine was expiring, to restart the machine if needed. This tombstone period is similar to what is done with a physical machine. It is turned off, but not disconnected. If someone complains before the end of a short period of time that the deactivated resource is needed, then the physical machine can be restarted without a loss of data or other resources.

The next state is a Disposing state 840. In this state, the machine is disposed of and the files cleaned. In a Final state 850, the resources that were associated with the virtual machine are retuned to the pool to be accessed by another user. The workflow instantiated at the beginning of the life cycle, that is, at the Provisioning state 810, takes the machine through to this final state. One of ordinary skill in the art would appreciate that the provisioning system could employ multiple workflows or hard coded routines to control the life cycle of a machine or other virtual resource.

Figure 9:
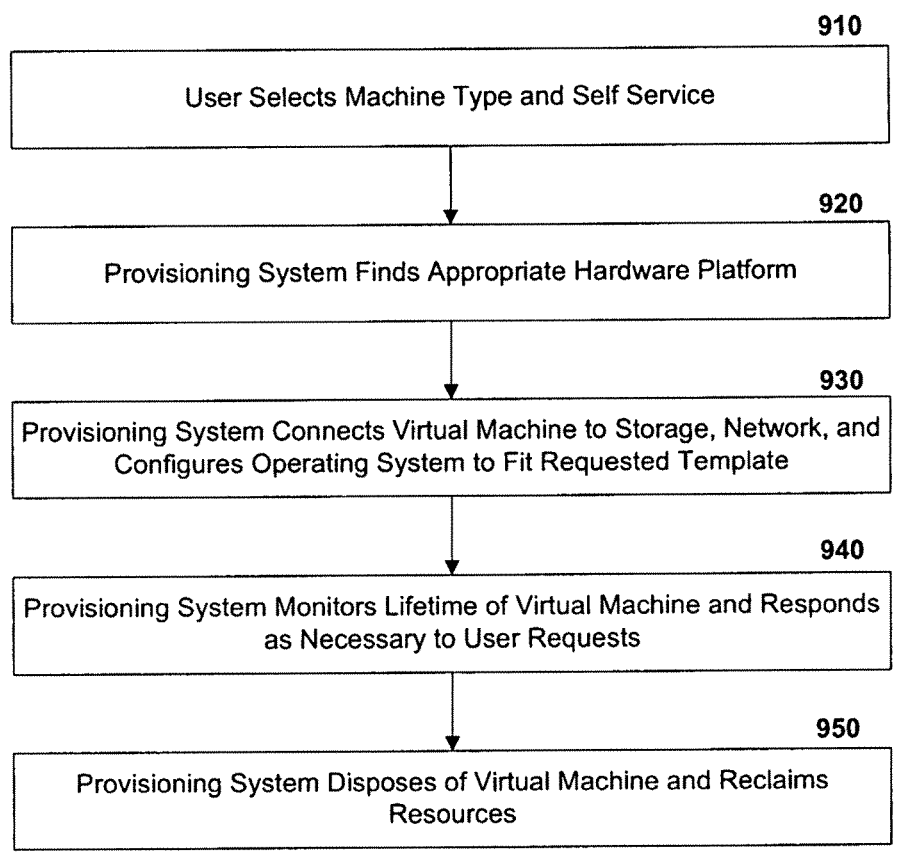
FIG. 9 depicts the lifecycle of a virtual machine in accordance with an exemplary embodiment of the present invention.

FIG. 9 depicts a lifecycle 900 of a virtual machine in accordance with an exemplary embodiment of the present invention. Referring to FIGS. 4, 8, and 9, at step 910 in the lifecycle, a user 401 selects a machine to create using a self-service web feature to choose a template. Next, at step 920, the machine is provisioned by the provisioning system 420, which identifies the physical resource that will host the virtual machine. Then, at step 930, the provisioning system 420 connects the virtual machine to storage and configures the operating system to conform with the definition in the selected template. In this step of the lifecycle, the provisioning system 420 interacts with an agent, such as agent 460, resident on the physical host, to establish the virtual machine. Then, at step 940, the provisioning system 420 monitors the operation of the created machine. Finally, at step 950, after the machine expires, the provisioning system 420 destroys the machine, cleans the files, and reclaims the physical resources on the host. As discussed above, in connection with FIG. 8, step 950 may include an Expired state 830, where the virtual machine is tombstoned before it is disposed.

Figure 10:
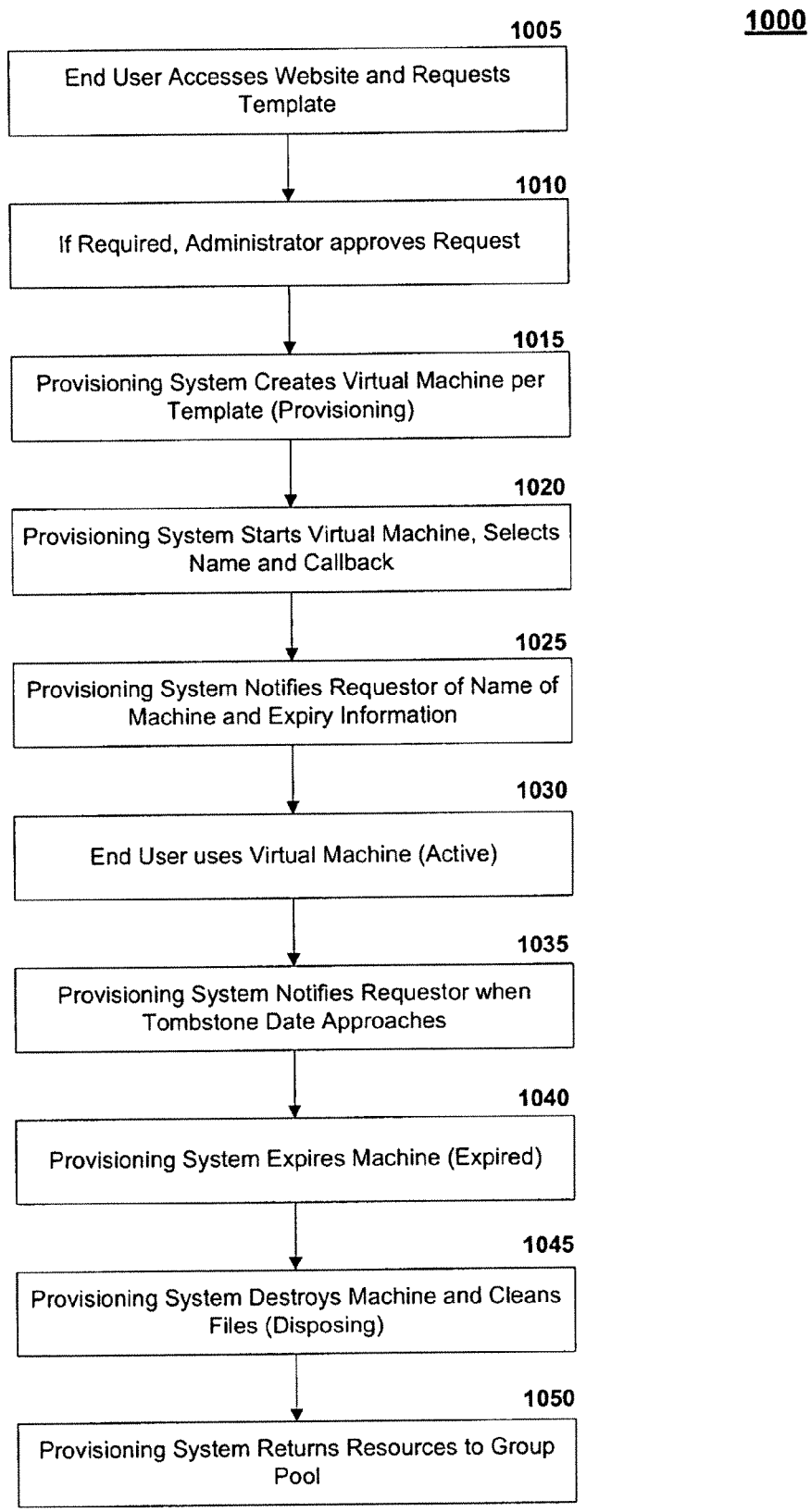
FIG. 10 depicts the lifecycle of a virtual machine in accordance with an exemplary embodiment of the present invention.

FIG. 10 depicts the lifecycle of a virtual machine, showing the interaction of a user with the life cycle in accordance with an exemplary embodiment of the present invention. Referring to FIGS. 4, 8, and 10, in step 1005, a user, such as user 401, selects a template to create a virtual machine. The provisioning system 420 would cause web pages to be rendered that provide the user 401 with options, including the templates that are available to that user. The user 401 would then select a template corresponding to the machine to be created. At step 1010, if required, an administrator approves the request.

At step 1015, the provisioning system 420 instantiates a provisioning workflow to create the requested machine. The machine enters the Provisioning state 810. The workflow instructs an agent, such as agent 460, to create the machine as defined in the template. For an embodiment that employs agents that poll the provisioning system 420, the agent gets the instruction to create the machine the next time the agent polls the provisioning system 420. At step 1020, the workflow chooses a name and callback for the machine. At step 1025, the workflow then notifies the user of the name of the machine and the expiry information for the machine.

At step 1030, the created machine is active and the end user uses the machine. The workflow changes to the Active state 820. At step 1035, the Active workflow notifies the user when the expiration date is near and that the machine will be tombstoned. If the user does not extend the lease, the machine enters the Expired state 830 for the tombstone period, at step 1040. Alternatively, the lease could be extended and the Active state 820 continues. The request to extend the lease may need approval from the group administrator. The lease could still be extended during the Expired state 830.

After expiration, at step 1045, the machine enters the Disposing state 840 and is destroyed. This destruction includes removing all of the files associated with the machine. At step 1050, the machine enters the Final state 850 and its resources are returned to the group pool for access by other users. Alternatively, a virtual machine could be powered off at step 1045, yet not destroyed or cleaned. In that way, some resources associated with the machine can be returned to the group reservation pool at step 1050 (except for the disk storage space that contains the files for the virtual machine) and the machine can lay dormant until needed again.

Figure 11:
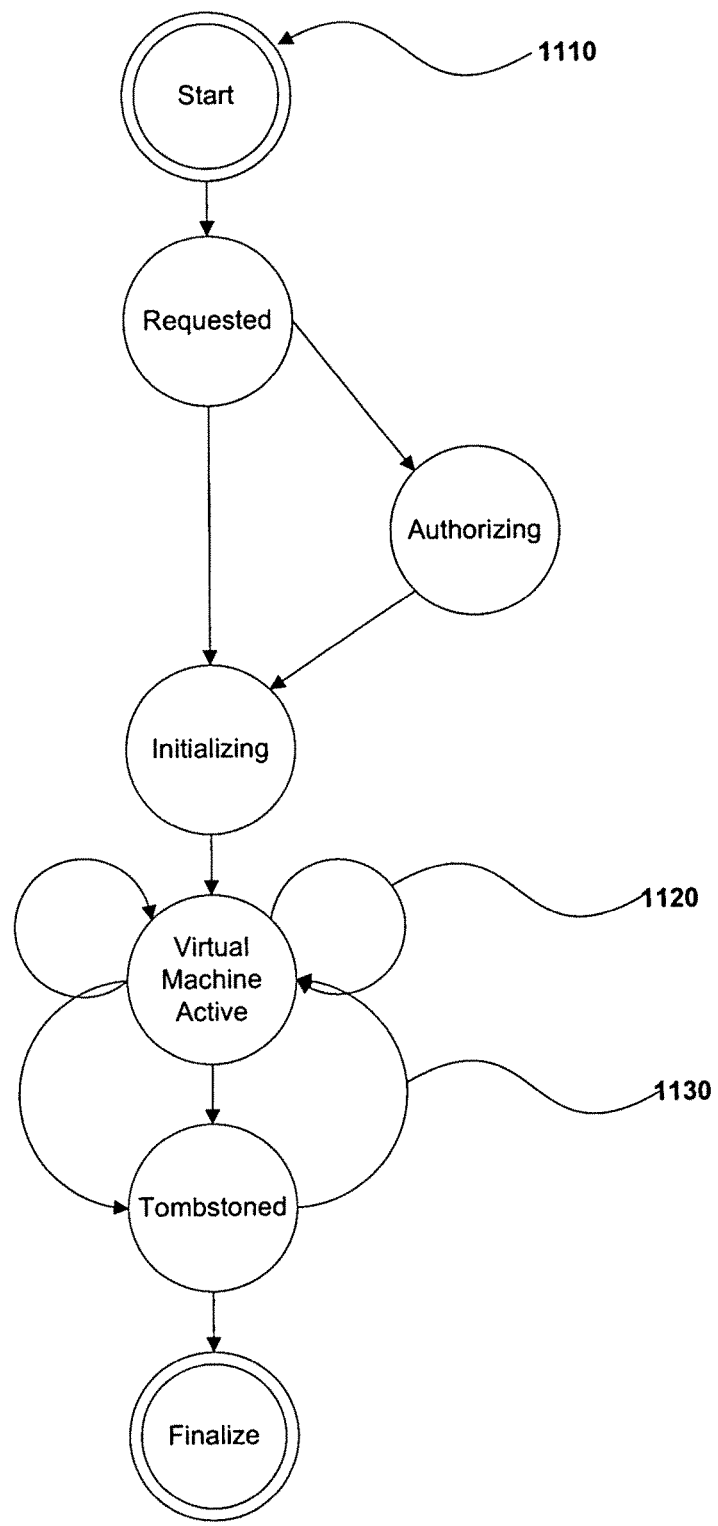
FIG. 11 depicts an example of a workflow in accordance with an exemplary embodiment of the present invention.

FIG. 11 depicts an example of a workflow 1100 in accordance with an exemplary embodiment of the present invention. A key feature of an exemplary embodiment of the present invention is the use of workflows. Workflows have the advantage of flexibility—processes are not hard coded into the system.

When a request comes in for a virtual machine, the system creates an instance of that type of workflow associated with the handler of the request. An instance of the workflow comes to life at the "Start" step 1110. The workflow remains alive for the duration of the lifetime of the virtual machine. The system disposes of the workflow when the machine is destroyed and the files have been cleaned up. So each virtual machine that exists in the environment actually has an associated workflow instance that exists at any one time, and each one has a separate workflow. This approach allows the system to keep track of the status of all machines. Also, system administrators, such as an enterprise administrator, can change a workflow as the system is running or create a new workflow—any new virtually machines created after the change will follow the new workflow. Graphical tools enable an administrator to convert a simple process flow into a workflow for the system. The administrators can create workflows without knowing how to program. They actually create the flow and describe visually the flow and the business process of creating a machine in the environment. They can add in all the steps required to provision a machine. All of this work can be done without writing computer code. For example, using these graphic tools, an administrator can reflect interactions within an activity or between activities in a workflow, such as interactions 1120 and 1130.

Referring to FIG. 11, a workflow begins at "Start" 1110. The next action of the workflow responds to a request. The request may need approval, as seen in the next action of the workflow. The machine is then initialized, active, tombstoned, then finalized. The workflow depicts interactions between activities, such as reflected in interaction 1130, where a tombstoned virtual machine can be reactivated when its lease is extended. This workflow goes through the complete life cycle of the machine. The states may trigger additional workflows, such as a workflow that emails the user when the expiry date approaches. In this exemplary embodiment, the workflow is an XML document stored in the SQL server database.

FIGS. 12a-m depict illustrative computer screens from a graphical user interface in accordance with an exemplary embodiment of the present invention. The individual screens provide exemplary functionality that a user could access, including an end user or an administrator.

Figure 12A:
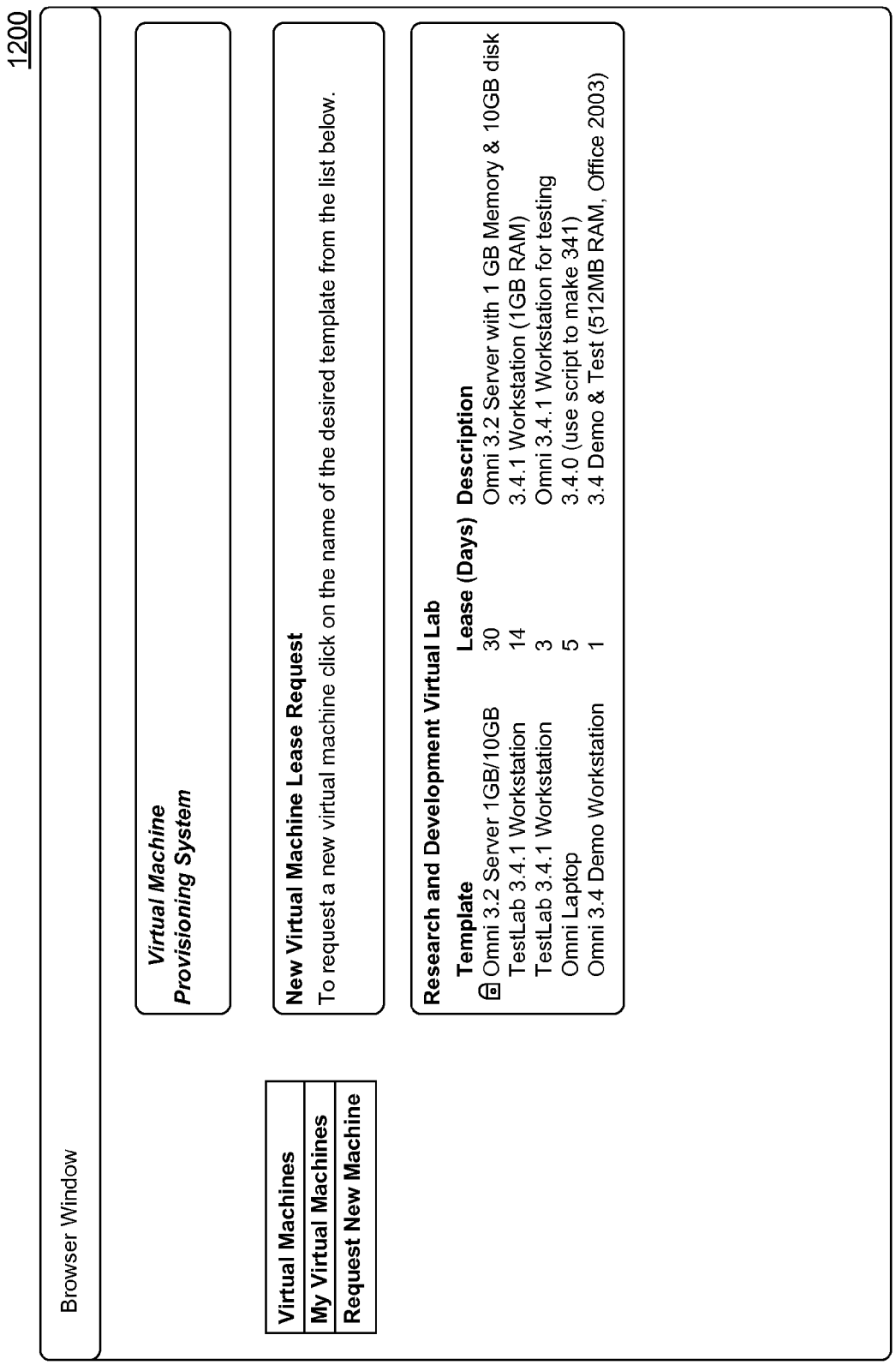

Referring to FIG. 12a, a screen 1200 provides an initial screen that may be seen by an end user of virtual machines when they request a machine be created. The user can choose the type of machine they would like to create from the "Virtual Machines" menus. The left side of the screen allows the user to "Request New Machine." In response to that request, the screen presents those templates available to the user. In exemplary screen 1200, the user is a member of a single group ("Research and Development Virtual Lab"). A user that is a member of multiple groups would be presented templates for each group for which the user belongs. A template type with the padlock next to it, "Omni 3.2 Server 1 GB/10 GB" as seen in screen 1200, requires approval from an group administrator.

Figure 12B:
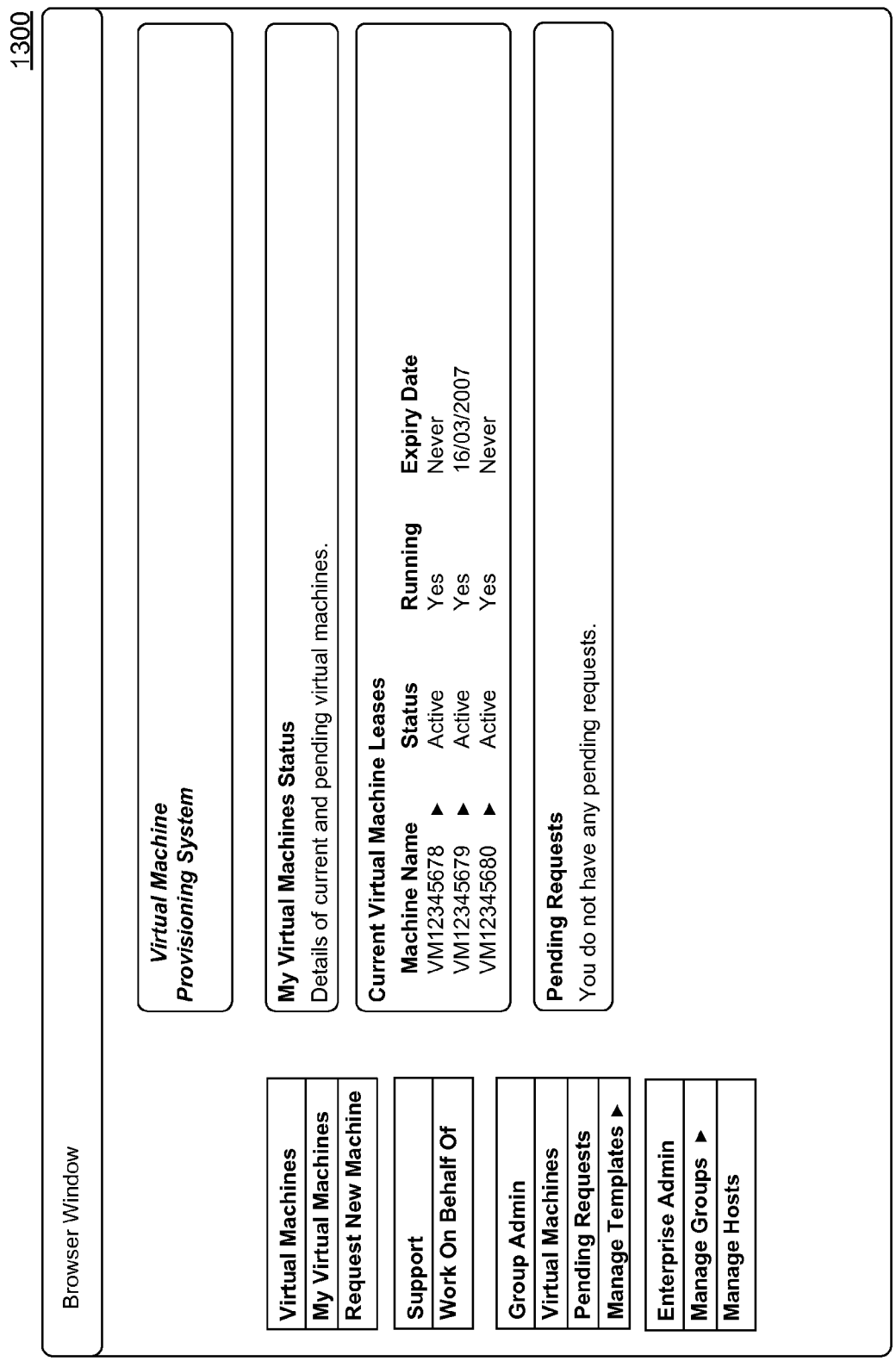

Referring to FIG. 12b, a screen 1300 shows the user the current machines leased to that user. The screen includes the status of the machine and its expiry date.

Referring to FIG. 12c, a screen 1400 depicts an initial screen presented to a user for creating a virtual machine where that user is a member of multiple groups (in this illustration, "NY Research and Development Virtual Lab," "DBE Virtual Lab," "DTACC Virtual Lab," and Research and Development Virtual Lab"). As can be seen in the illustrative screen 1400, the user has access to multiple templates in multiple groups. Some of these templates require administrator approval to create.

Referring to FIG. 12d, a screen 1500 presents the user with the parameters of a requested virtual machine, so the user can confirm that the requested machine has the necessary parameters. In this case, the user has extended privileges, perhaps by also being a group administrator, such that the user can enter "additional custom properties" for the requested machines. Typically, a provisioning system would limit the ability of users to add custom properties so as to better manage available resources. Of course, in some embodiments of the present invention, end users may have the flexibility to add custom properties as part of the creation process.

Referring to FIG. 12e, a screen 1600 provides an administrator with a summary report of the status, expiry date, owner, group, and host of virtual machines within a group. This status provides a dynamic picture of the resources being managed. The arrow next to the "Machine Name" for individual machines indicates that a drop-down menu exists that allows the administrator to manage the machine.

Figure 12F:
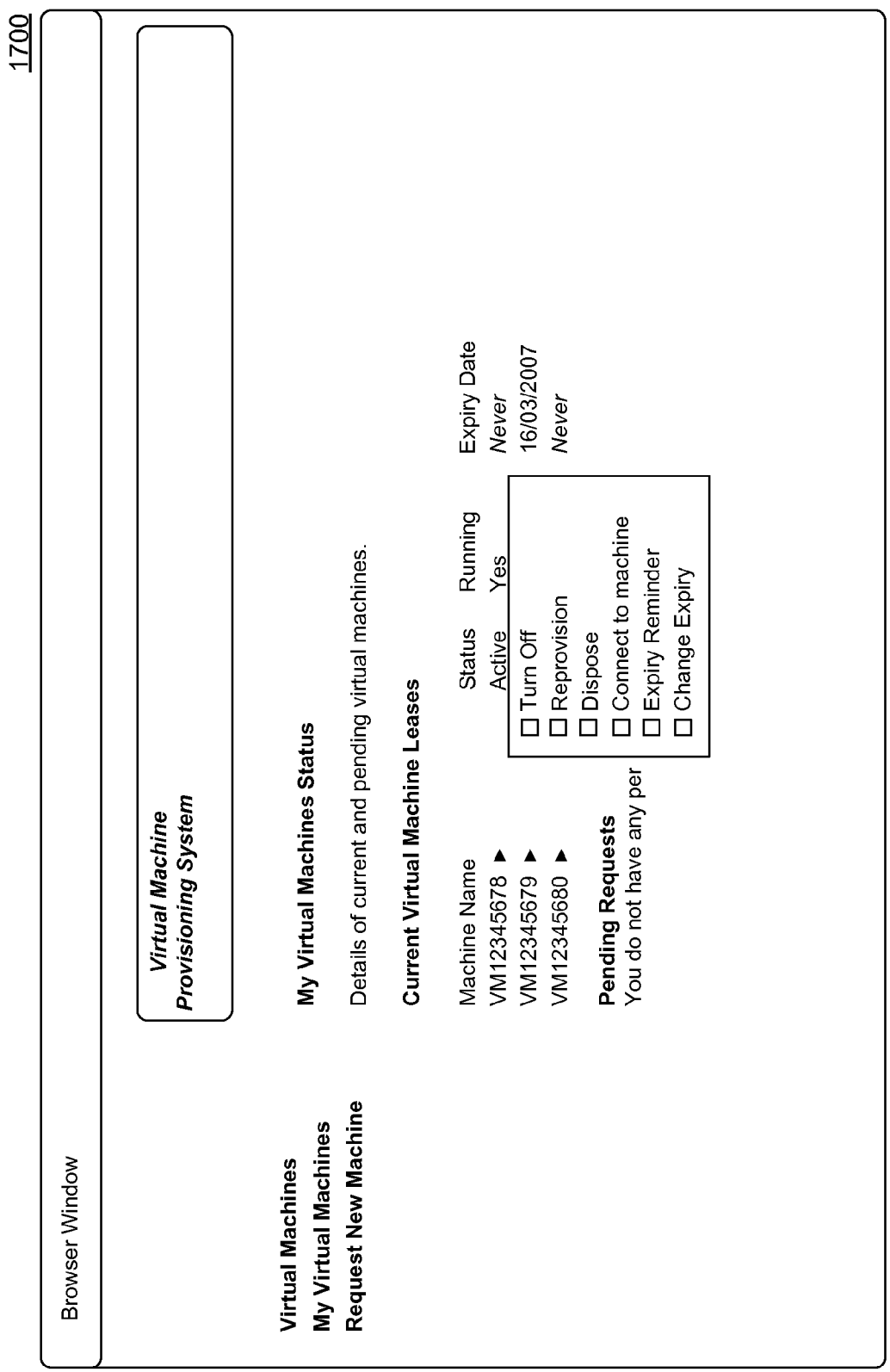

Referring to FIG. 12f, a screen 1700 illustrates actions that a user may take to manage machines leased to that user. Each machine has an associated drop-down menu (indicated by the arrow next to the "Machine Name"). This menu allows the user to turn off, reprovision, or dispose of the machine; connect to the machine; set an expiry reminder; or change the expiry date.

Figure 12G:
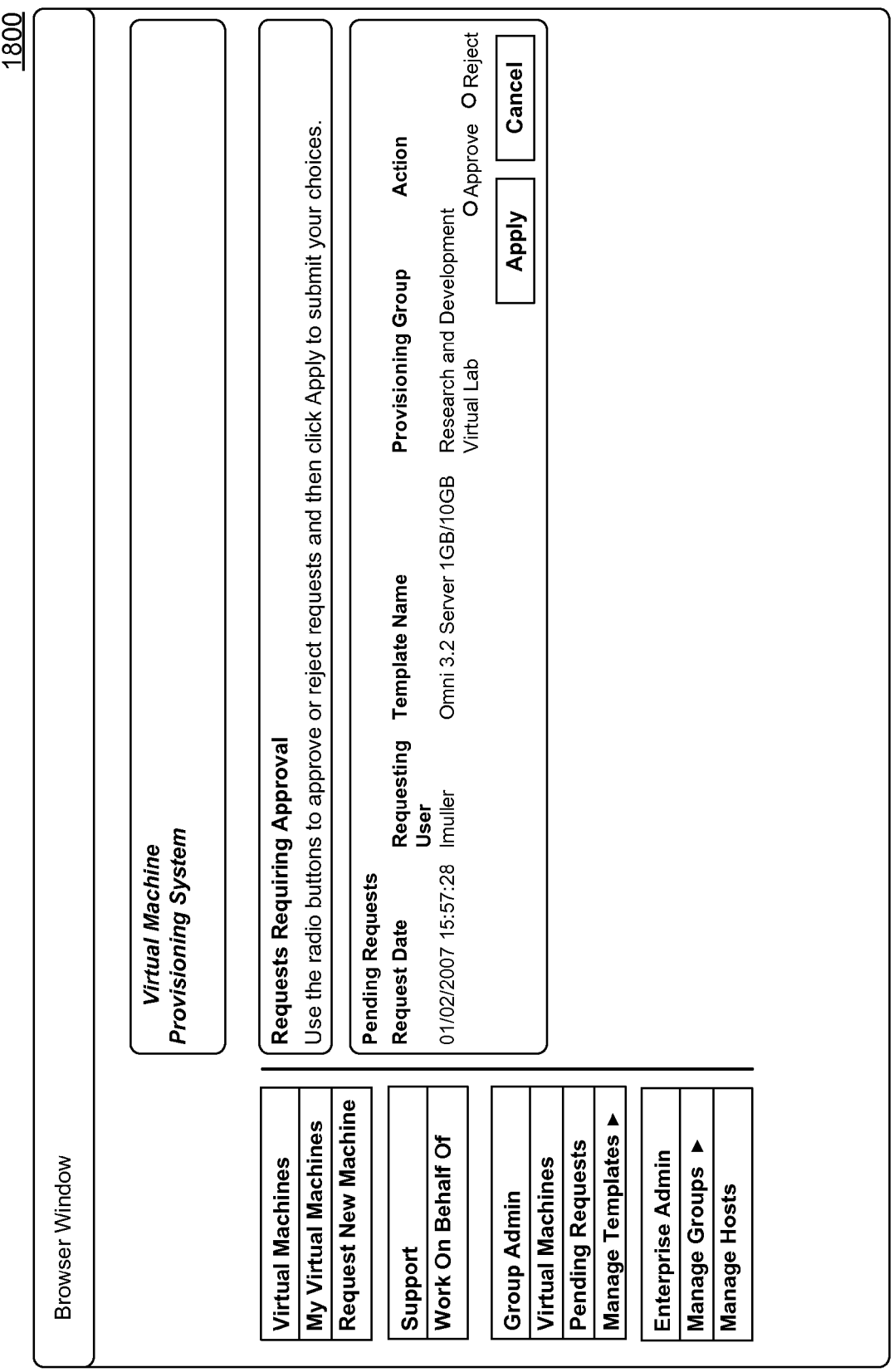

Referring to FIG. 12g, a screen 1800 illustrates a screen shown to a group administrator when the administrator must approve a request to create a virtual machine. A system may always require this approval, never require approval, or require selective approval for machines that may tax the resources available to a group (or for another reason).

Referring to FIG. 12h, a screen 1900 allows the administrator to view and manage the templates in the administrator's group or groups. If applicable, the specific group that uses the template would be identified under the "Group" heading. In this illustration, the administrator administers to multiple groups.

Figure 12J:
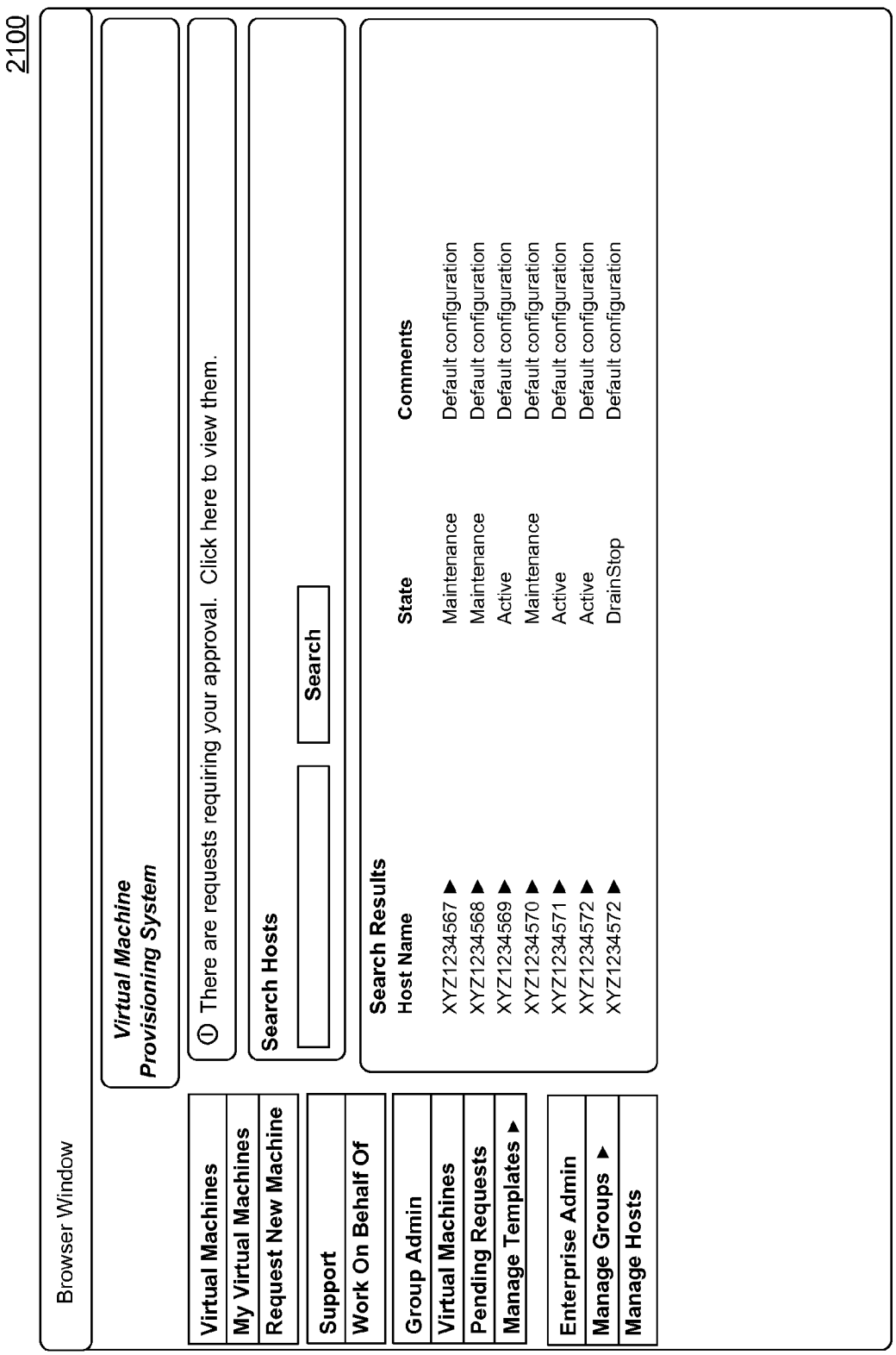
Figure 12K:
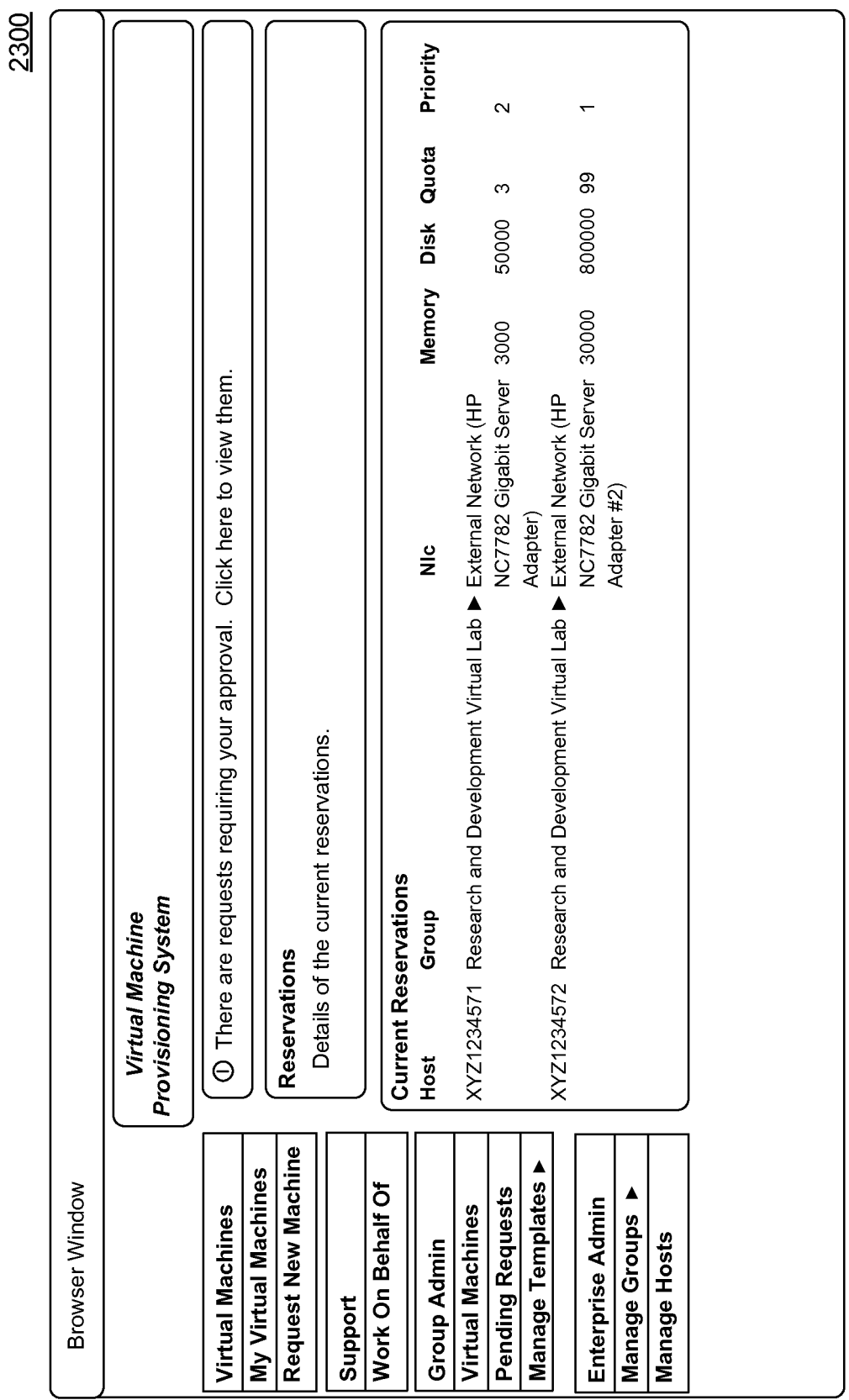
Figure 12I:
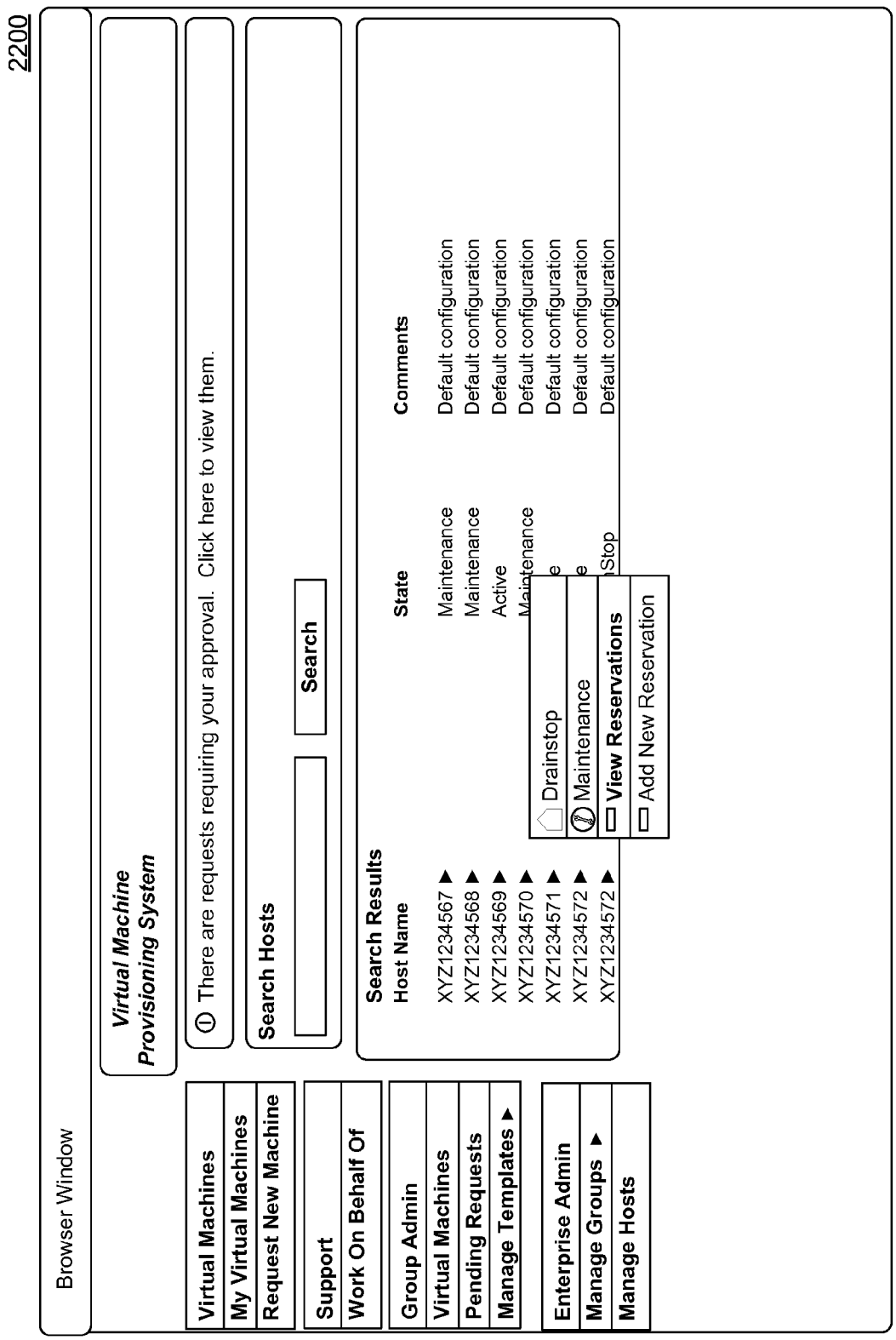

Referring to FIG. 12i, a screen 2000 allows an enterprise administrator to manage and view resource groups. This listing would include the "Group Name" and the name of the "Administrator" for that group under the appropriate headings. As can be seen in the menu to the left of screen 2000, the enterprise administrator can "Create Group," that is, can create a new group. The arrow next to the "Group Name" for individual groups indicates that a drop-down menu exists that allows the enterprise administrator to manage the group.

Referring to FIGS. 12j and 12k, a screen 2100 allows the administrator to see a list of physical host servers. The arrow next to the "Host Name" for individual hosts indicates that a drop-down menu exists that allows the enterprise administrator to manage the host. A screen 2200 shows the options available to the administrator in managing the host, including adding a new reservation to the host, thus allocating host resources to a group.

Referring to FIG. 12l, a screen 2300 allows an administrator to manage and view a resource group allocated to one or more physical hosts. This screen 2300 provides the administrator with the quota of resource allocated to each host. This listing would include the specific "Host" name designated by the enterprise.

Referring to FIG. 12m, a screen 2400 allows an administrator to create or edit a template for a machine that can be created by group members. The details of the machine may include the specific network drive path for the virtual hard drive (VHD), such as "\\omni32test\VHD\VM." The template provides the configuration for the machine and its lifespan. Custom properties includes the "BuildType," or the type of operating system for the machine. Custom properties also include the administrator's name and email address.

The discussion above focuses on virtual machines. One of ordinary skill in the art would appreciate that the provisioning system could be used to automate the management of physical computers, such as servers. The same web portal and workflow model could be employed to allow administrators to status and control machines, such as turning off machines that are not sued over the weekend to conserve energy. Additionally, other virtual resources, such as virtual storage and virtual networks could be created and managed using the present invention.

One of ordinary skill in the art would appreciate that the present invention provides systems and methods for managing virtual and real machines. A provisioning system allows a user to create and manage machines through a "self-service" approach. The provisioning system interacts with one or more agents that manage the lifecycle of a machine. The system may provide templates that enable a user to readily create a virtual machine. The system may also include interfaces for administrators to manage virtual and real machine resources.

What is claimed:

1. A system for managing virtual computer resources, comprising:
   a provisioning module configured to receive a request to act on one of a plurality of virtual resources;
   a workflow engine logically connected to the provisioning module and configured to generate a lifecycle workflow of the virtual resource based on the request, the lifecycle workflow defining a timing for provisioning, tombstoning, and disposing the virtual resource; and
   an agent logically connected to the provisioning module, the agent configured to:
      receive instructions to implement the request to act on one of a plurality of virtual resources;
      act on the virtual resource in response to the request; and
      dynamically provide a status of the virtual resource.

2. The system of claim 1 wherein the workflow engine is further configured to generate the lifecycle workflow according to workflow states and activities available for selection based on a particular role among a group of user roles.

3. The system of claim 2 further comprising a security module logically connected to the provisioning module and the workflow engine and configured to restrict an available selection of templates of virtual resources and the workflow states and activities based on access permissions associated with the particular role.

4. The system of claim 1 further comprising a client module logically connected to the provisioning module and configured to allow an end user to submit the request to the provisioning module.

5. The system of claim 1 further comprising an image store comprising images of virtual resources logically connected to the agent, wherein the agent retrieves an image associated with the virtual resource and copies the image onto one or more of the physical hosts.

6. The system of claim 1 wherein the agent resides on a proxy and remotely controls one of a plurality of physical hosts, and the agent is further configured to provide a notification that an expiration time of the virtual resource is approaching based on the lifecycle workflow.

7. The system of claim 1, wherein the received request corresponds to one or more templates of virtual resources.

8. The system of claim 7 wherein the request specifies the one or more templates of virtual resources each including an allocation of physical resources associated with a plurality of physical hosts.

9. The system of claim 1 wherein the provisioning module is further configured to dynamically determine states of a plurality of virtual resources based on a status provided by the agent, wherein the determination comprises a measure of physical resources used on a plurality of physical hosts.

10. A system for managing virtual computer resources, comprising:
    one or more templates each comprising a configuration for a virtual resource including an allocation of one or more physical resources;
    a provisioning module configured to receive a request to act on the virtual resource and automatically generate instructions to implement the request, the request corresponding to a template of the one or more templates;
    a workflow engine logically connected to the provisioning module and configured to instantiate a lifecycle workflow of the virtual resource based on the request, the lifecycle workflow including provisioning, tombstoning, and disposing the virtual resource; and
    a plurality of agents, at least one of the agents being logically connected to the provisioning module and configured to receive the instructions and to act on the virtual resource in response to the request.

11. The system of claim 10, wherein the workflow engine is further configured to instantiate the lifecycle workflow according to a selection of workflow states and activities available for selection based on a particular role among a group of user roles, the lifecycle workflow defines respective timings for each of the provisioning, tombstoning, and disposing, and the system further comprises a security module logically connected to the provisioning module and the workflow engine and configured to restrict an available selection of templates of virtual resources and the workflow states and activities based on access permissions associated with the particular role.

12. The system of claim 10 further comprising a client module logically connected to the provisioning module and configured to allow an end user to submit the request to the provisioning module.

13. The system of claim 10 further comprising an image store comprising images of virtual resources logically connected to the agents, wherein the at least one of the agents retrieves an image associated with the virtual resource and copies the image onto one or more of the physical hosts.

14. The system of claim 10 wherein each of the plurality of agents resides on a proxy and controls one of a plurality of physical hosts remotely.

15. The system of claim 14 wherein the provisioning module is further configured to dynamically determine states of a plurality of virtual resources based on a status provided by the plurality of agents, wherein the determination comprises a measure of physical resources used on the plurality of physical hosts.

16. A method for controlling computer resources comprising the steps of:
    receiving, by at least one computer, a request for an action on a virtual resource;
    generating, by the at least one computer, a lifecycle workflow of the virtual resource based on the request, the lifecycle workflow defining timings for provisioning, tombstoning, and disposing the virtual resource;
    automatically instructing, by the at least one computer, an agent associated with one of a plurality of physical hosts via an instruction in response to receiving the request, the instruction comprising an action associated with the request; and
    receiving, by the at least one computer, status information on the virtual resource.

17. The method of claim 16 wherein the step of generating a lifecycle workflow further comprises generating, by the at least one computer, the lifecycle workflow according to a selection of workflow states and activities available for selection based on a particular role among a group of user roles.

18. The method of claim 16 further comprising the step of automatically instructing, by the at least one computer, the agent via a second instruction, wherein the second instruction comprises an action not in response to the request.

19. The method of claim 18 further comprising providing a notification, by the at least one computer, that an expiration time of the virtual resource is approaching based on the lifecycle workflow.

20. The method of claim 18 wherein the request is associated with one or more templates each specifying a respective allocation of physical resources associated with the plurality of physical hosts.

21. A system for managing computer resources, the system comprising a processor programmed to:
  a receive a request to act on a computer resource, automatically generate instructions to implement the request, and dynamically monitor the computer resource;
  in response to the request, generate a lifecycle workflow of the computer resource according to a selection of workflow states and activities available for selection based on a particular role among a group of user roles, the lifecycle workflow defining timings for provisioning, tombstoning, and disposing the computer resource;
  receive the instructions;
  act on the computer resource in response to the request;
  dynamically provide a status of the computer resource; and
  restrict a nature of the request and the workflow states and activities available for selection based on access permissions associated with the particular role.

22. The system of claim 21 wherein the computer resource comprises a computer storage resource.

23. The system of claim 21 wherein the computer resource comprises a computer network connection resource.

24. The system of claim 21, wherein in response to instructions received in association with an administrator role of the group of user roles the processor is further programmed to modify the selection of workflow states and activities available for selection by the particular role.

25. The system of claim 21, wherein in response to instructions received in association with an administrator role of the group of user roles, the the processor is further programmed to modify workflow states and timings of all lifecycle workflows associated with the particular role.

26. The system of claim 21, wherein in response to instructions received in association with an administrator role of the group of user roles, the processor is further programmed to:
  modify workflow states and timings of the lifecycle workflow of the virtual resource; and
  receive instructions based on the modified workflow states and timings.

27. The system of claim 21, wherein in response to a status request received in association with an enterprise role of the group of user roles, the processor is further programmed to provide a status of each virtual resource operating on the plurality of physical hosts with reference to the lifecycle workflow.

28. A method for managing a lifecycle of a virtual machine comprising:
  receiving, by at least one computer, a request for a virtual machine;
  providing, by the at least one computer, a listing of virtual machine templates and lifecycle workflows available for selection;
  obtaining, by the at least one computer, a selection of a virtual machine template and a lifecycle workflow;
  instantiating, by the at least one computer, a provisioning workflow associated with the selected virtual machine template based on the selected lifecycle workflow and in accordance with a selection of workflow states and activities available for selection based on a particular role among a group of user roles, the group of user roles including support, end user, group administrator, and enterprise administrator roles, and wherein the provisioning workflow includes provisioning, tombstoning, and disposing the virtual machine;
  provisioning, by the at least one computer, the virtual machine on a physical host; and
  activating, by the at least one computer, the virtual machine according to a timing specified by the provisioning workflow.

29. The method of claim 28, wherein the virtual machine is unavailable during the tombstoning, and the tombstoning occurs for a predefined period of time before the disposing after expiring, and the method further comprises receiving, by the at least one computer, a command to reactivate the virtual machine during the predefined period of time; and reactivating the virtual machine in response to the command.

30. The method of claim 28, further comprising restricting, by the at least one computer, the listing of virtual machine templates and lifecycle workflows available for selection based on access permissions associated with the particular role.

* * * * *